(12) United States Patent
Suzuki

(10) Patent No.: US 8,031,313 B2
(45) Date of Patent: Oct. 4, 2011

(54) LATERAL ELECTRIC FIELD TYPE LIQUID CRYSTAL DISPLAY DEVICE

(75) Inventor: Teruaki Suzuki, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 333 days.

(21) Appl. No.: 12/464,140

(22) Filed: May 12, 2009

(65) Prior Publication Data

US 2009/0284704 A1   Nov. 19, 2009

(30) Foreign Application Priority Data

May 12, 2008   (JP) .................................. 2008-125318

(51) Int. Cl.
*G02F 1/1343* (2006.01)
(52) U.S. Cl. .......................... 349/144; 349/141; 349/143
(58) Field of Classification Search .................. None
See application file for complete search history.

(56) References Cited

U.S. PATENT DOCUMENTS

| 3,807,831 | A | 4/1974 | Soref | |
|---|---|---|---|---|
| 7,872,720 | B2 * | 1/2011 | Ikebe | 349/139 |
| 2006/0290869 | A1 * | 12/2006 | Suzuki | 349/143 |
| 2007/0013854 | A1 * | 1/2007 | Yoo et al. | 349/143 |

FOREIGN PATENT DOCUMENTS

| JP | 63-21907 | 5/1988 |
|---|---|---|
| JP | 07-036058 | 2/1995 |
| JP | 10-307295 | 11/1998 |
| JP | 2002-323706 | 11/2002 |

* cited by examiner

*Primary Examiner* — Hemang Sanghavi
(74) *Attorney, Agent, or Firm* — Young & Thompson

(57) ABSTRACT

A lateral electric field type LCD device displays images uniformly and stably, where abnormally displayed areas caused by mechanical deformation such as a press with a finger do not remain on the display screen for a long time. A first liquid crystal driving electrode and a second liquid crystal driving electrode comprise a first bend and a second bend, respectively. Each pixel region is divided into a first sub-region and a second sub-region by the first and second bends as a boundary in such a way that a rotation direction of liquid crystal molecules in the first sub-region is different from that in the second sub-region. A boundary stabilization electrode is formed at least one of the first and second bends, wherein a shape or position of the boundary stabilization electrode deviates from a line of symmetry of the first and second bends.

20 Claims, 19 Drawing Sheets

LATERAL ELECTRIC FIELD TYPE LIQUID CRYSTAL DISPLAY DEVICE

BACKGROUND OF THE INVENTION

1. Field of the Invention

The present invention relates to a Liquid Crystal Display (LCD) device and more particularly, to an active-matrix addressing LCD device of the lateral electric field type, such as the In-Plane Switching (IPS) type.

2. Description of the Related Art

Generally, the LCD device has the features such as low profile, reduced weight, and low power consumption. In particular, the active-matrix addressing LCD device that drives the respective pixels arranged vertically and horizontally in a matrix array with the active elements has ever been recognized as a high image quality flat-panel display device. Especially, the active-matrix addressing LCD device using thin-film transistors (TFTs) as the active elements for switching the respective pixels has been extensively diffused.

Most of active-matrix addressing LCD devices, which utilizes the electrooptic effects of the TN (Twisted Nematic) type liquid crystal material sandwiched by two substrates, display images by the application of electric field approximately vertical to the main surfaces of the substrates across the liquid crystal material to thereby cause displacement of the liquid crystal molecules of the said material. These LCD devices are termed the "vertical electric field" type. On the other hand, some of the active-matrix addressing LCD devices display images by the application of electric field approximately parallel to the main surfaces of the substrates across the liquid crystal material to thereby cause displacement of the liquid crystal molecules of the said material in the planes approximately parallel to the said main surfaces. These LCD devices have been known also, which are termed the "lateral electric field" type. Various improvements have ever been made not only for the vertical electric field type LCD devices but also for the lateral electric field type ones. Some of the improvements made for the latter will be exemplified below.

For example, an electrode structure using comb-tooth electrodes mated with each other in the lateral electric field type LCD device is disclosed in the Patent Document 1 (i.e., U.S. Pat. No. 3,807,831) issued in 1974 (see claim 1, FIGS. 1 to 4 and FIG. 11).

An electrode structure using comb-tooth electrodes mated with each other for reducing the parasitic capacitance between the common electrode and the drain bus lines or between the common electrode and the gate bus lines in the active-matrix addressing LCD device that utilizes the electrooptic effect of the TN type liquid crystal material is disclosed in the Patent Document 2 (i.e., Japanese Examined Patent Publication No 63-21907) published in 1988 (see claim 1, FIG. 7 and FIGS. 9 to 13).

A technique that realizes the generation of lateral electric field in the active-matrix addressing LCD device using TFTs is disclosed in the Patent Document 3 (i.e., Japanese Unexamined Patent Publication No. 7-036058) published in 1995 (see claims 1 and 5, and FIGS. 1 to 23). With this technique, the common electrode(s) and the image signal electrodes or the common electrode(s) and the liquid crystal driving electrodes are respectively formed on different layers from each other in such a way that an insulating film intervenes between them, and at the same time, the common electrode(s) or the liquid crystal driving electrodes is/are formed to be ring-, cross-, T-, Π-, H-, or ladder-shaped.

Furthermore, a technique that reduces the display coloring phenomenon in the slant views is disclosed in the Patent Document 4 (i.e., Japanese Unexamined Patent Publication No. 10-307295) published in 1998 (see claim 5, and FIGS. 4 and 6), where the electrodes for generating lateral electric field are bent to form bends, thereby intentionally making the driving (rotating) direction of the liquid crystal molecules different from each other in the respective regions with the bends of the said electrodes in the state where electric field is applied.

FIGS. 1 and 2 show an example of the structure of the lateral electric field type LCD device disclosed in the Patent Document 4. FIG. 1 is a plan view of the active-matrix substrate of this LCD device and FIG. 2 is a cross-sectional view of this LCD device along the line II-II in FIG. 1. Both of these figures show the structure of one of the pixel regions thereof because all the pixel regions have the same structure.

On the active-matrix substrate of the related-art LCD device shown in FIGS. 1 and 2, gate bus lines 155 are formed to extend along the lateral (or horizontal) direction of FIG. 1, and drain buss lines 156 are formed to extend along the vertical (or longitudinal) direction of FIG. 1 in such a way as to be bent repeatedly, thereby forming the pixel regions in the respective areas defined by the gate and drain buss lines 155 and 156. These pixel regions are arranged along the lateral and vertical directions of FIG. 1 to form a matrix array. In addition, common bus lines 152 are formed in parallel to the gate bus lines 155. One of the common bus lines 152 is located near the upper end positions of the pixel regions that are arranged laterally in one row of the matrix, and another of the common bus lines 152 is located near the lower end positions of the same pixel regions. Therefore, two of the common bus lines 152 are assigned to each pixel region. Thin-Film Transistors (TFTs) 145 are formed near the respective intersections of the gate bus lines 155 and the drain bus lines 156. Each of the pixel regions comprises one of the TFTs 145.

The gate bus lines 155 and the common bus lines 152 are straight; however, the drain bus lines 156 are bent to be V-shaped in the respective pixel regions, as shown in FIG. 1. Each pixel region is also bent to be V-shaped.

A pixel electrode 171 and a common electrode 172, each of which serves as a liquid crystal driving electrode for generating liquid crystal driving electric field, are formed in each pixel region. The pixel electrode 171 and the common electrode 172 are made of transparent conductive material.

In each pixel region, as shown in FIG. 1, the pixel electrode 171 is connected electrically and mechanically to the source electrode 142 of the corresponding TFT 145 and is laterally ladder-shaped. The part of the pixel electrode 171 that constitutes each rung of the ladder (i.e., the rung part of the pixel electrode 171) is bent to be V-shaped along the drain bus lines 156. The common electrode 172 is connected electrically and mechanically to the two common bus lines 152 located at the upper and lower positions of the pixel region and is laterally ladder-shaped also. The part of the common electrode 172 that constitutes each rung of the ladder (i.e., the rung part of the common electrode 172) is bent to be V-shaped along the drain bus lines 156.

The pixel electrode 171 comprises the three V-shaped rung parts and the common electrode 172 comprises the four V-shaped rung parts. The pixel electrode 171 and the common electrode 172 are arranged in such a way that their rung parts are alternately aligned at equal intervals along the lateral direction of FIG. 1. The pixel region is divided into the first sub-region 101 placed at the upper position of FIG. 1 and the second sub-region 102 placed at the lower position thereof.

The rung parts of the pixel electrode 171 and those of the common electrode 172 are shifted to each other clockwise by a predetermined angle with respect to the vertical direction of FIG. 1 in the first sub-region 101. In the second sub-region 102, the rung parts of the pixel electrode 171 and those of the common electrode 172 are shifted to each other counterclockwise by the same angle with respect to the vertical direction of FIG. 1.

As explained above, the source electrode 142 of the TFT 145 is connected electrically and mechanically to the corresponding pixel electrode 171. However, the drain electrode 144 of the same TFT 145 is connected electrically and mechanically to the corresponding drain bus line 156 which is located on the left side of FIG. 1. The gate electrode (not shown) of the same TFT 145 is connected electrically and mechanically to the corresponding gate bus line 155 which is located at the bottom of FIG. 1. The drain electrode 144 and the source electrode 142 are arranged at each side of the island-shaped semiconductor film 143 of the same TFT 145 in such a way as to be overlapped with the same semiconductor film 143.

As shown in FIG. 2, the common electrodes 172 are formed directly on the surface of a transparent plate 111 and are covered with an interlayer insulating film 157 formed on the surface of the plate 111. Although not shown in FIG. 2, the gate bus lines 155, the common bus lines 152, and the gate electrodes of the TFTs 145 are also formed directly on the surface of the plate 111 and are covered with the interlayer insulating film 157. The pixel electrodes 171 and the drain bus lines 156 are formed on the interlayer insulating film 157. Therefore, the pixel electrodes 171 and the drain bus lines 156 are electrically insulated from the common electrodes 172, the gate bus lines 155, the common bus lines 152, and the gate electrodes by the interlayer insulating film 157.

The pixel electrode 171 and the common electrode 172 are overlapped with each other in the pixel region in such a way that the interlayer insulating film 157 intervene between these electrodes 171 and 172, thereby forming additional capacitors with their overlapped parts.

Although not shown in FIG. 2, the source electrodes 142, the drain electrodes 144, and the semiconductor films 143 of the TFTs 145 are also formed on the Interlayer insulating film 157. Therefore, the source electrodes 142, the drain electrodes 144, and the semiconductor films 143 are electrically insulated from the common electrodes 172, the gate bus lines 155, the common bus lines 152, and the gate electrodes by the interlayer insulating film 157.

A protective insulating film 159 is formed on the interlayer insulating film 157. The pixel electrodes 171 and the drain bus lines 156, and the source electrodes 142, the drain electrodes 144 and the semiconductor films 143 of the TFTs 145 are covered with the protective insulating film 159.

An alignment film 131 made of an organic polymer is formed on the protective insulating film 157. The surface of the alignment film 131 has been subject to a predetermined aligning treatment.

On the other hand, an opposite substrate, which is coupled with the above-described active-matrix substrate, comprises a transparent plate 112 on which a color filter (not shown) including three primary colors, red (R), green (G), and blue (B), is formed corresponding to the respective pixel regions. A black matrix (not shown) for blocking light is formed on the plate 112 in the area excluding the regions corresponding to the pixel regions. A planarization film (not shown) is formed to cover the color filter and the black matrix on the plate 112. Moreover, columnar spacers (not shown) are formed on the planarization film. An alignment film 132 made of an organic polymer is formed on the planarization film so as to cover the spacers. The surface of the alignment film 132 has been subject to a predetermined aligning treatment.

The active-matrix substrate and the opposite substrate with the above-described structures are superposed with each other at a predetermined gap, where the surfaces of the substrates on which the alignment films 131 and 132 are respectively placed are faced inward. A liquid crystal material 120 is confined in the gap between the active-matrix and opposite substrates, forming a liquid crystal layer 122. A pair of polarizer plates (not shown) is arranged on the outer surfaces of the active-matrix and opposite substrates, respectively.

As shown in FIG. 1, the surfaces of the alignment films 131 and 132 have been subject to the aligning treatment uniformly in such a way that the liquid crystal molecules 121 existing in the liquid crystal layer 122 are aligned in parallel along the longitudinal (or vertical) direction of FIG. 1 when no electric field is applied. In the example of FIG. 1, the liquid crystal material 120 used is of the positive type. However, the liquid crystal material 120 may be of the negative type. In this case, the surfaces of the alignment films 131 and 132 will be respectively subject to aligning treatments in such a way that the liquid crystal molecules 121 are aligned in parallel to the lateral (or horizontal) direction of FIG. 1.

The penetration axes of the above-described pair of polarizer plates are intersected at right angles with each other. The penetration axis of one of the polarizer plates is in accordance with the initial alignment direction (i.e., the alignment direction when no electric field is applied) of the liquid crystal molecules 121.

Next, an example of the fabrication process steps of the related-art LCD device shown in FIGS. 1 and 2 will be explained below.

Regarding the active-matrix substrate, first, chromium (Cr) film is formed on the surface of the transparent plate 111 made of glass and is patterned to have a predetermined shape, forming the gate bus lines 155 and the common electrodes 172 on the surface of the plate 111. Next, a silicon nitride ($SiN_x$) film is formed on the surface of the plate 111 to cover the gate bus lines 155 and the common electrodes 172 thus formed, resulting in the interlayer insulating film 157. Subsequently, a semiconductor film, which is used for forming the active layers of the TFTs 145, is formed on the interlayer insulating film 157 and patterned, forming the island-shaped semiconductor films 143 at the respective positions that overlap with the corresponding gate bus lines 155 in such a way that the interlayer insulating film 157 intervenes between them. Moreover, a Cr film is formed on the interlayer insulating film 157 and patterned, forming the source electrodes 142 and the drain electrodes 144, the drain bus lines 156, and the pixel electrodes 171 on the interlayer insulating film 157. Following this, a $SiN_x$ film is formed on the interlayer insulating film 157 to cover the source and drain electrodes 142 and 144, the drain bus lines 156, and the pixel electrodes 171, resulting in the protective insulating film 159. In this way, the active-matrix substrate is fabricated.

Regarding the opposite substrate, first, the color filter and the black matrix are selectively formed on the surface of the transparent plate 112 made of glass. Thereafter, the planarization film is formed to cover the color filter and the black matrix. Moreover the columnar spacers are formed on the planarization film. In this way, the opposite substrate is fabricated.

Following this, the alignment films 131 and 132, which are made of polyimide, are respectively formed on the surface of the active-matrix substrate and the surface of the opposite substrate with the above-described structures. Then, the surfaces of the alignment films 131 and 132 are uniformly subjected to the predetermined aligning treatments, respectively. Subsequently, the active-matrix substrate and the opposite substrate are superposed on each other to form a gap of 4.0 μm between them and thereafter, a nematic liquid crystal material whose refractive index anisotropy is 0.075 is injected into the gap between these two substrates in a vacuum chamber (not shown). Finally, the polarizer plates are respectively adhered onto the outer surfaces (i.e., backs) of the substrates. As a result, a LCD panel is fabricated.

A driver LSI (Large-Scale Integrated Circuit) and a backlight unit are mounted on the LCD panel thus fabricated. Thus, the fabrication process steps of the related-art LCD device shown in FIGS. 1 and 2 are completed.

With the related-art LCD device shown in FIGS. 1 and 2, when a voltage is applied, liquid crystal driving electric field is generated along a direction slightly inclined clockwise with respect to the lateral direction of FIG. 1 in the first sub-region 101 and at the same time, liquid crystal driving electric field is generated along a direction slightly inclined counterclockwise with respect to the lateral direction of FIG. 1 in the second sub-region 102. Therefore, the liquid crystal molecules 121, which have been uniformly aligned along the vertical direction of FIG. 1 when no electric field is applied, are rotated counterclockwise in the first sub-region 101 and clockwise in the second sub-region 102 by the liquid crystal driving electric field applied. In this way, the rotation directions of the liquid crystal molecules 121 in the first and second sub-regions 101 and 102 are made different from each other and consequently, the display coloring phenomenon dependent on the viewing angle change can be suppressed.

However, the above-described related-art LCD device shown in FIGS. 1 and 2 has the following problem.

Specifically, the related-art LCD device of FIGS. 1 and 2 does not have any stabilization structure for stabilizing the liquid crystal molecules 121 on the boundary between the first and second subregions 101 and 102 in each pixel region and therefore, distortion of the liquid crystal domains is likely to occur. In particular, when the size of liquid crystal domains is reduced in accordance with the smaller pixels for realizing higher resolution, for example, the adjoining liquid crystal domains tend to be merged indefinitely in shape, or the liquid crystal domain which should be present at a specific Location tends to disappear. In this way, such the distortion of the liquid crystal domains as described here is more likely to occur in the case of the miniaturized liquid crystal domains. As a result, a problem of display roughness and/or display unevenness will take place.

In particular, this problem will be conspicuous if the display screen of the LCD device is pressed with a finger or the like. Once the liquid crystal domains are distorted due to the finger pressing or the like, an appropriate measure, such as stopping the operation of the LCD device (i.e., electric power shutdown) and leaving the device as it is for a while, needs to be taken for recovering the liquid crystal domain distortion (which is seen as a finger-pressed mark) thus generated.

To solve this problem, another example of the electrode structure of the lateral electric field type LCD device disclosed in the Patent Document 4 is effective. This electrode structure is shown in FIG. 3.

The structure of the related-art LCD device shown in FIG. 3 is the same as that of the related-art LCD device of FIGS. 1 and 2 except that the pixel electrode 171 and the common electrode 172, which are formed on the active-matrix substrate, comprise respectively whisker-shaped boundary stabilization electrodes 195 and 196 formed at the bends 173 and 174 of the electrodes 171 and 172 in such a way as to protrude from the bends 173 and 174 along the boundary between the first and second sub-regions 101 and 102. Therefore, the explanation for the same structural elements will be omitted here by attaching the same reference numerals as those used in the above explanation for the device structure of FIGS. 1 and 2 to the same elements shown in FIG. 3. In addition, the structure of the opposite substrate is the same as that shown in FIG. 2.

Since the device structure of FIG. 3 comprises the whisker-shaped boundary stabilization electrodes 195 and 196, the rotation directions of the liquid crystal molecules 121 in the first and second sub-regions 101 and 102 do not become opposite to their desired rotation directions in the vicinities of the V-shaped bends 173 and 174 (in other words, on the boundary of the first and second sub-regions 101 and 102), respectively. This means that the rotation directions of the liquid crystal molecules 121 in the respective sub-regions 101 and 102 are stable. As a result, images can be displayed uniformly and stably with the device structure of FIG. 3.

Another device structure comprising the boundary stabilization electrodes 195 and 196 of FIG. 3 is shown in FIGS. 4 and 5. FIG. 4 is a plan view of the active-matrix substrate of the related-art LCD device with this structure, and FIG. 5 is a cross-sectional view of the LCD device along the line V-V in FIG. 4. The device structure of FIGS. 4 and 5 utilize the technique disclosed in the Patent Document 5 (i.e., Japanese Unexamined Patent Publication No. 2002-323706) published in 2002 (see FIGS. 68 and 69 and paragraphs 0426 to 0430).

The device structure of FIGS. 4 and 5 is the same as that of FIGS. 1 and 2 except for the following points (a) and (b). Therefore, the explanation for the same structural elements will be omitted here by attaching the same reference numerals as those used in the above explanation for the device structure of FIGS. 1 and 2 to the same elements shown in FIGS. 4 and 5. In addition, the structure of the opposite substrate is the same as that shown in FIG. 2.

The different points (a) and (b) of the structure of FIGS. 4 and 5 are:

(a) the pixel and common electrodes 171 and 172 serving as the liquid crystal driving electrodes formed on the active-matrix substrate are comb-tooth-shaped and arranged in such a way as to be mated with each other, where the pixel and common electrodes 171 and 172 are formed by a transparent conductive material film located on an upper layer (i.e. on a layer closer to the liquid crystal layer 120) than the gate bus lines 155 and the drain bus lines 156; and (b) boundary stabilization electrodes 195a and 196a, which are in the electrically floating state, are formed in such a way as to be overlapped with the bends 173 and 174 of the pixel and common electrodes 171 and 172, respectively, where the boundary stabilization electrodes 195a and 196a are formed by a metal film located on the same layer as that of the gate bus lines 155 and the drain bus lines 156.

The related-art device structure of FIGS. 4 and 5 will be explained in detail below.

With the structure of FIGS. 4 and 5, similar to the related-art device structure of FIGS. 1 and 2, the interlayer insulating film 157 and the protective insulating film 159 are stacked on the surface of the transparent plate 111 in this order. In addition to the insulating films 157 and 159, an interlayer insulating film 160 is formed on the protective insulating film 159. Unlike the structure of FIGS. 1 and 2, both of the pixel electrodes 171 and the common electrodes 172 are formed on the interlayer insulating film 160.

The pixel electrode 171 comprises three comb-tooth parts extending like a V character along the V-shaped drain bus lines 156. The common electrode 172 comprises four comb-tooth parts extending like a V character along the V-shaped drain bus lines 156. The comb-tooth parts of the pixel and common electrodes 171 and 172 are alternately arranged at predetermined intervals along the gate bus lines 155 and mated with each other in the pixel region.

On the surface of the glass plate 111, auxiliary common electrodes 172a are formed in addition to the gate bus lines 155, the common bus lines 152, and the gate electrodes of the TFTs 145, which are covered with the interlayer insulating film 157. Two of the auxiliary common electrodes 172a are assigned to each pixel region. These auxiliary common electrodes 172a are respectively arranged in the vicinities of the two drain bus lines 156 located at each side of the pixel region and are extended along the same drain bus lines 156. The auxiliary common electrodes 172a are provided for electrical interconnection between the common electrodes 172 formed on the interlayer insulating film 160 and the corresponding common bus lines 152 formed on the transparent plate 111.

On the interlayer insulating film 157, auxiliary pixel electrodes 171a are formed in addition to the drain bus lines 156, and the source electrodes 142, the drain electrodes 144 and the semiconductor films 143 of the TFTs 145, which are covered with the protective insulating film 159. One of the auxiliary pixel electrodes 171a is assigned to each pixel region. The auxiliary pixel electrode 171a is overlapped with the central comb-tooth part of the pixel electrode 171 located at the center of the pixel region and is extended along the same. The auxiliary pixel electrode 171a is provided for electrical interconnection between the pixel electrode 171 formed on the interlayer insulating film 160 and the corresponding source electrode 142 formed on the interlayer insulating film 157. Therefore, the auxiliary pixel electrode 171a is connected electrically and mechanically to the corresponding source electrode 142 in the pixel region.

In each pixel region, the pixel electrode 171 is electrically connected to the corresponding source electrode 142 of the TFT 145 by way of a corresponding contact hole 161 that penetrates through the protective insulating film 159 and the interlayer insulating film 160, and the corresponding auxiliary pixel electrode 171a. The common electrode 172 is electrically connected to the corresponding common bus line 152 by way of a corresponding contact hole 162 that penetrates through the interlayer insulating film 157, the protective insulating film 159, and the interlayer insulating film 160, and the auxiliary common electrode 172a.

The drain electrode 144 is connected electrically and mechanically to the corresponding drain bus line 156, and the gate electrode of the TFT 145 is connected electrically and mechanically to the corresponding gate bus line 155. These points are the same as the device structure of FIGS. 1 and 2. The alignment film 131 made of an organic polymer is formed on the interlayer insulating film 160, and the surface of the alignment film 131 has been subjected to a predetermined aligning treatment. These points also are the same as the device structure of FIGS. 1 and 2.

The structure of the opposite substrate is the same as that of the device structure of FIGS. 1 and 2. Thus, the explanation for the opposite substrate is omitted here.

Even with the related-art lateral electric field type LCD device shown in FIGS. 4 and 5, the electrically-floating boundary stabilization electrodes 195a and 196a are respectively provided for the pixel and common electrodes 171 and 172, and thus, the rotation directions of the liquid crystal molecules 121 near the border of the first and second sub-regions 101 and 102 are stabilized. As a result, images can be displayed uniformly and stably.

As seen from the above explanations, with the related-art device structure of FIG. 3 where the boundary stabilization electrodes 195 and 196 are respectively provided at the bends 173 and 174 of the pixel and common electrodes 171 and 172, and with the related-art device structure of FIGS. 4 and 5 where the electrically-floating boundary stabilization electrodes 195a and 196a are respectively provided for the pixel and common electrodes 171 and 172, the rotation directions of the liquid crystal molecules 121 near the bends 173 and 174 (in other words, near the boundary between the first and second sub-regions 101 and 102) are controlled more accurately, compared with the related-art device structure of FIGS. 1 and 2 that comprises no boundary stabilization electrodes. For this reason, the previously-described phenomenon that a finger-pressed mark remains for a long time on the display screen due to abnormal liquid crystal domains is difficult to occur.

However, even if one of these related-art device structures is used, the minute curvature of disclination lines (which is caused by abnormal alignment of the liquid crystal molecules 121) at the bends 173 and 174 cannot be controlled precisely. For this reason, a problem that a slight finger-pressed mark is inevitably perceived by the user if he/she looks at the display screen of the LCD device obliquely arises. According to the inventor's search, it was found that this problem is caused by the following reason:

Specifically, as shown in FIG. 6, when a part A of the display screen on the boundary between the first and second sub-regions 101 and 102, which is defined by a circle illustrated by a dot-dash line, is pressed with a finger, disclination (i.e., abnormal alignment) will occur near the pressed part A, even if the boundary stabilization electrodes 195 and 196 are formed at the bends 173 and 174. Moreover, disclination lines 1101 are formed in such a way as to curve and deviate from the line of symmetry of the bends 173 and 174 toward its right or left side (in other words, upward or downward in FIG. 6). The right-curved disclination line 1101 and the left-curved disclination line 1101 are equally likely to occur. Accordingly, there is a possibility that the curvature or state of the disclination lines 1101 in the finger-pressed area A is changed from the pattern of FIG. 6 to the pattern of FIG. 7.

Originally, in the places positioned at each side of the border of the first and second sub-regions 101 and 102, the rotation of the liquid crystal molecules 121 caused by the action of the applied liquid crystal driving electric field are different in direction from each other; therefore, the effects of the liquid crystal driving electric field to the obliquely incoming incident light are different from each other in these places. Here, the fact that the curvature of the disclination line 1101 on the border of the first and second sub-regions 101 and 102 is changed by pressing the display screen with a finger has a meaning that the size (or area) balance of these places where the rotation directions of the liquid crystal molecules 121 are different will deviate partially, although the quantity of this deviation is slight. Accordingly, when the user looks at the display screen obliquely, such the slight deviation of the size (or area) balance is observed as a slight finger pressed mark.

SUMMARY OF THE INVENTION

The present invention was created to solve the above-described problem of the related-art lateral electric field type LCD device shown in FIGS. 4 and 5.

An object of the present invention is to provide a lateral electric field type LCD device that makes it possible to display images uniformly and stably in such a way that abnormally displayed areas caused by mechanical deformation such as a press with a finger do not remain on the display screen for a long time.

Another object of the present invention is to provide a lateral electric field type LCD device that makes it possible to suppress completely a slight finger-pressed mark observed when the user looks at the display screen obliquely.

The above objects together with others not specifically mentioned will become clear to those skilled in the art from the following description.

According to the first aspect of the present invention, a lateral electric field type LCD device is provided, which comprises:

a first substrate and a second substrate opposed to each other at a predetermined gap;

a liquid crystal layer formed in the gap between the first substrate and the second substrate;

a first liquid crystal driving electrode and a second liquid crystal driving electrode, formed in each of pixel regions, for applying liquid crystal driving electric field to the liquid crystal layer;

the first liquid crystal driving electrode and the second liquid crystal driving electrode comprising a first bend and a second bend, respectively:

each of the pixel regions being divided into a first sub-region and a second sub-region by the first bend and the second bend as a boundary, wherein a rotation direction of liquid crystal molecules in the first sub-region is different from a rotation direction of liquid crystal molecules in the second sub-region; and a boundary stabilization electrode formed at least one of the first bend and the second bend, wherein a shape or position of the boundary stabilization electrode is deviated from a line of symmetry of the first bend and the second bend.

With the lateral electric field type LCD device according to the first aspect of the present invention, the boundary stabilization electrode is formed at least one of the first bend of the first liquid crystal driving electrode (e.g., a pixel electrode) and the second bend of the second liquid crystal driving electrode (e.g., a common electrode) wherein the shape or position of the boundary stabilization electrode is deviated from the line of symmetry of the first bend and the second bend. Therefore, the disclination line or route running on the boundary stabilization electrode is likely to bend or curve to one of the two sides of the boundary stabilization electrode in accordance with the degree of the deviation of the shape or position of the boundary stabilization electrode.

For this reason, even if the above-identified disclination line sways temporarily by a mechanical deformation such as a press with a finger applied to the display screen of this LCD device, this disclination line is inclined to return to the deviation side of the boundary stabilization electrode. This means that this disclination line is restored to its original state or pattern in a short time and become stable.

Accordingly, images can be displayed uniformly and stably in such a way that abnormally displayed areas caused by mechanical deformation such as a press with a finger do not remain on the display screen for a long time.

In particular, even a slight finger-pressed mark observed when the user looks at the display screen obliquely, which has not been solved anyhow so far, can be suppressed completely.

In a preferred embodiment of the LCD device according to the first aspect of the present invention, the boundary stabilization electrode is electrically connected to the first liquid crystal driving electrode.

In another preferred embodiment of the LCD device according to the first aspect of the present invention, the boundary stabilization electrode is united with the first liquid crystal driving electrode as a protrusion that protrudes from the first bend.

In still another preferred embodiment of the LCD device according to the first aspect of the present invention, the boundary stabilization electrode is electrically insulated from the first liquid crystal driving electrode and the second liquid crystal driving electrode.

In a further preferred embodiment of the LCD device according to the first aspect of the present invention, the boundary stabilization electrode is electrically insulated from the first liquid crystal driving electrode and the second liquid crystal driving electrode, and is overlapped with the first liquid crystal driving electrode.

In a still further preferred embodiment of the LCD device according to the first aspect of the present invention, a top or bottom of the boundary stabilization electrode comprises a deviation or shift from the line of symmetry, wherein the deviation or shift is set at a value in a range from approximately ($\frac{1}{3}$) of a thickness of the liquid crystal layer to approximately twice of the thickness of the liquid crystal layer.

In a still further preferred embodiment of the LCD device according to the first aspect of the present invention, the first liquid crystal driving electrode is ladder-shaped to have first rung parts, and the second liquid crystal driving electrode is ladder-shaped to have second rung parts;

wherein the first rung parts and the second rung parts are alternately arranged at intervals along the boundary in each of the pixel region; and each of the first rung parts comprises the first bend, and each of the second rung parts comprises the second bend.

In a still further preferred embodiment of the LCD device according to the first aspect of the present invention, the first liquid crystal driving electrode comprises first comb-tooth parts, and the second liquid crystal driving electrode comprises second comb-tooth parts;

wherein the first comb-tooth parts and the second comb-tooth parts are alternately arranged at intervals along the boundary in each of the pixel region; and each of the first comb-tooth parts comprises the first bend, and each of the second comb-tooth parts comprises the second bend.

According to the second aspect of the present invention, another lateral electric field type LCD device is provided, which comprises:

a first substrate and a second substrate opposed to each other at a predetermined gap;

a liquid crystal layer formed in the gap between the first substrate and the second substrate;

a first liquid crystal driving electrode and a second liquid crystal driving electrode, formed in each of pixel regions, for applying liquid crystal driving electric field to the liquid crystal layer;

the first liquid crystal driving electrode and the second liquid crystal driving electrode comprising a first bend and a second bend, respectively:

each of the pixel regions being divided into a first subregion and a second sub-region by the first bend and the second bend as a boundary, wherein a rotation direction of liquid crystal molecules in the first sub-region is different from a rotation direction of liquid crystal molecules in the second sub-region;

a first boundary stabilization electrode formed at the first bend, wherein a shape or position of the first boundary stabilization electrode is deviated from a line of symmetry of the first bend and the second bend; and a second boundary stabilization electrode formed at the second bend, wherein a shape or position of the second boundary stabilization electrode is deviated from the line of symmetry of the first bend and the second bend.

The lateral electric field type LCD device according to the second aspect of the present invention is different from the lateral electric field type LCD device according to the first aspect of the present invention in that the first and second boundary stabilization electrodes are formed at the first and second bends, respectively.

With the lateral electric field type LCD device according to the second aspect of the present invention, the first boundary stabilization electrode is formed at the first bend of the first liquid crystal driving electrode and the second boundary stabilization electrode is formed at the second bend of the second liquid crystal driving electrode, wherein the shape or position of the first boundary stabilization electrode is deviated from the line of symmetry of the first bend and the second bend and the shape or position of the second boundary stabilization electrode is deviated from the same line of symmetry. Therefore, each of the disclination line or route running on the first boundary stabilization electrode and the disclination line or route running on the second boundary stabilization electrode is likely to bend or curve to one of the two sides of the first and second boundary stabilization electrodes in accordance with the degree of the deviation of the shape or position thereof.

For this reason, even if the above-identified disclination lines sway temporarily by a mechanical deformation such as a press with a finger applied to the display screen of this LCD device, these disclination lines are respectively inclined to return to their deviation sides. This means that these disclination lines are restored to their original states or patterns in a short time and become stable.

Accordingly, images can be displayed uniformly and stably in such a way that abnormally displayed areas caused by mechanical deformation such as a press with a finger do not remain on the display screen for a long time.

In particular, even a slight finger-pressed mark observed when the user looks at the display screen obliquely, which has not been solved anyhow so far, can be suppressed completely.

In a preferred embodiment of the LCD device according to the second aspect of the present invention, the first boundary stabilization electrode is electrically connected to the first liquid crystal driving electrode, and the second boundary stabilization electrode is electrically connected to the second liquid crystal driving electrode.

In another preferred embodiment of the LCD device according to the second aspect of the present invention, the first boundary stabilization electrode is united with the first liquid crystal driving electrode as a protrusion that protrudes from the first bend, and the second boundary stabilization electrode is united with the second liquid crystal driving electrode as a protrusion that protrudes from the second bend.

In still another preferred embodiment of the LCD device according to the second aspect of the present invention, each of the first boundary stabilization electrode and the second liquid crystal driving electrode is electrically insulated from the first liquid crystal driving electrode and the second liquid crystal driving electrode.

In a further preferred embodiment of the LCD device according to the second aspect of the present invention, the first boundary stabilization electrode is electrically insulated from the first liquid crystal driving electrode and the second liquid crystal driving electrode, and is overlapped with the first liquid crystal driving electrode; and the second boundary stabilization electrode is electrically insulated from the first liquid crystal driving electrode and the second liquid crystal driving electrode, and is overlapped with the second liquid crystal driving electrode.

In a still further preferred embodiment of the LCD device according to the second aspect of the present invention, a top or bottom of the first boundary stabilization electrode comprises a deviation or shift from the line of symmetry, wherein the deviation or shift is set at a value in a range from approximately ($\frac{1}{3}$) of a thickness of the liquid crystal layer to approximately twice of the thickness of the liquid crystal layer; and a top or bottom of the second boundary stabilization electrode comprises a deviation or shift from the line of symmetry, wherein the deviation or shift is set at a value in a range from approximately ($\frac{1}{3}$) of a thickness of the liquid crystal layer to approximately twice of the thickness of the liquid crystal layer.

In a still further preferred embodiment of the LCD device according to the second aspect of the present invention, the first liquid crystal driving electrode is ladder-shaped to have first rung parts, and the second liquid crystal driving electrode is ladder-shaped to have second rung parts;

wherein the first rung parts and the second rung parts are alternately arranged at intervals along the boundary in each of the pixel region; and each of the first rung parts comprises the first bend, and each of the second rung parts comprises the second bend.

In a still further preferred embodiment of the LCD device according to the second aspect of the present invention, the first liquid crystal driving electrode comprises first comb-tooth parts, and the second liquid crystal driving electrode comprises second comb-tooth parts;

wherein the first comb-tooth parts and the second comb-tooth parts are alternately arranged at intervals along the boundary in each of the pixel region; and each of the first comb-tooth parts comprises the first bend, and each of the second comb-tooth parts comprises the second bend.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
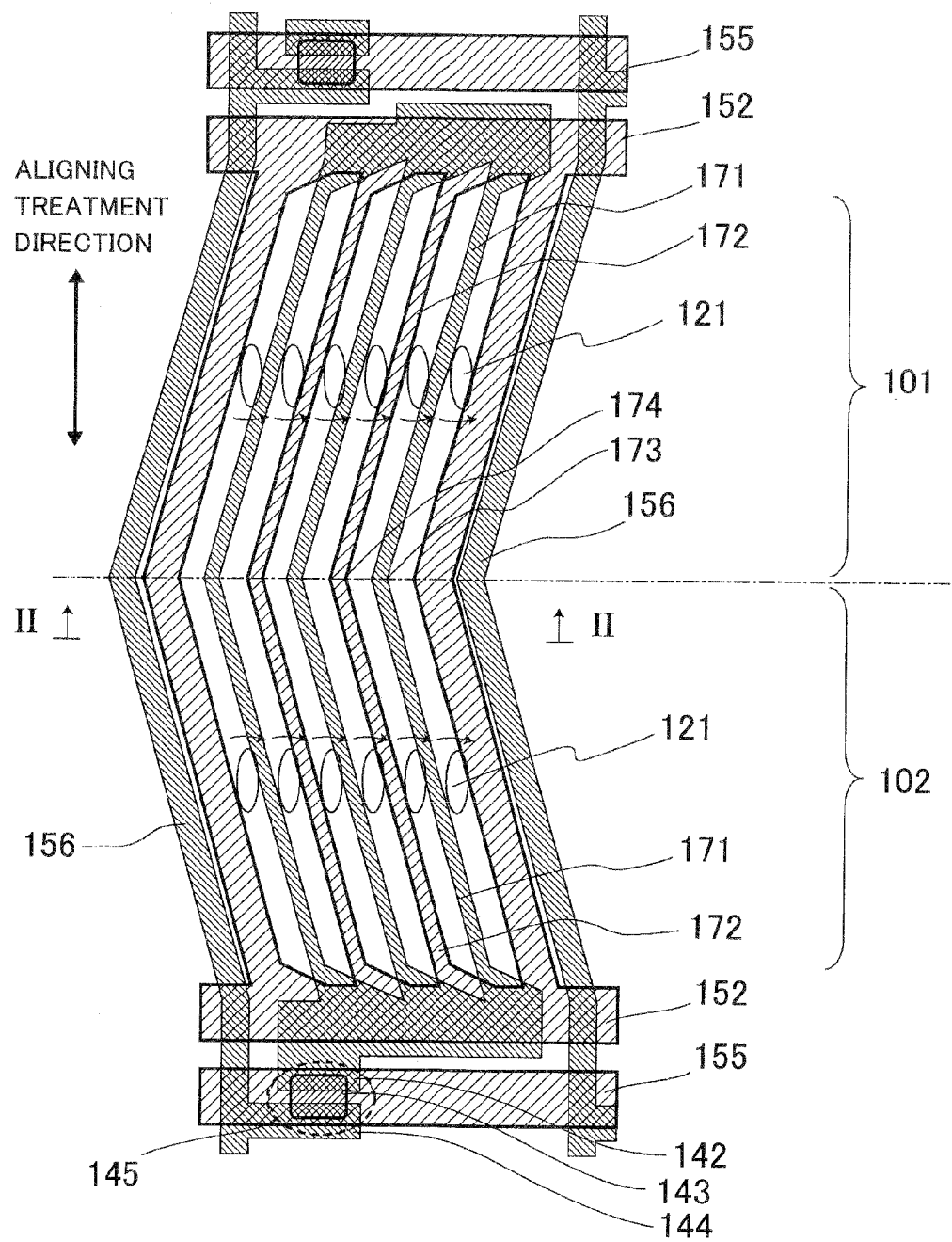
FIG. 1 is a plan view showing the structure of the active-matrix substrate of a related-art lateral electric field type LCD device disclosed in the Patent Document 4.

Preferred embodiments of the present invention will be described in detail below while referring to the drawings attached.

First Embodiment

A lateral electric field type LCD device according to the first embodiment of the present invention is shown in FIGS. 8, 9, 17A and 17B. Since all the pixel regions of this LCD device have the same structure, the structure of one pixel region is shown in these figures.

Figure 8:
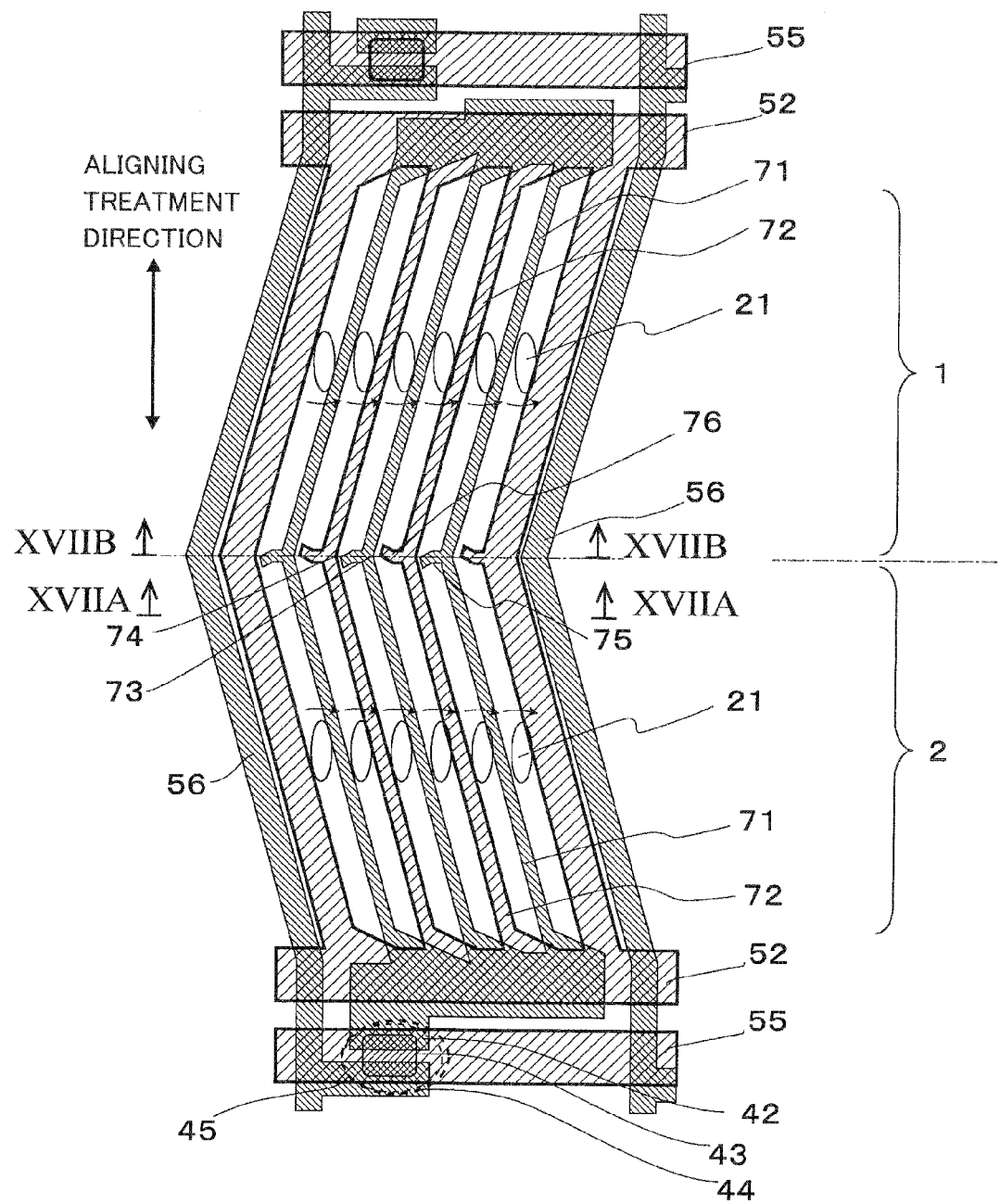
FIG. 8 is a plan view showing the structure of the active-matrix substrate of a lateral electric field type LCD device according to the first embodiment of the invention.

On the active-matrix substrate of the LCD device according to the first embodiment, as shown in FIG. 8, gate bus lines 55 are formed to extend along the lateral (or horizontal) direction of FIG. 8, and drain buss lines 56 are formed to extend along the vertical (or longitudinal) direction of FIG. 8 in such a way as to be bent repeatedly, thereby forming the pixel regions in the respective areas defined by the gate and drain buss lines 55 and 56. These pixel regions are arranged along the lateral and vertical directions of FIG. 8 to form a matrix array. In addition, common bus lines 52 are formed in parallel to the gate bus lines 55. One of the common bus lines 52 is located near the upper end positions of the pixel regions that are arranged laterally in one row of the matrix, and another of the common bus lines 52 is located near the lower end positions of the same pixel regions. Therefore, two of the common bus lines 52 are assigned to each pixel region. TFTs 45 are formed near the respective intersections of the gate bus lines 55 and the drain bus lines 56. Each of the pixel regions comprises one of the TFTs 45.

The gate bus lines 55 and the common bus lines 52 are straight; however, the drain bus lines 56 are bent to be V-shaped in the respective pixel regions, as shown in FIG. 8. Each pixel region is also bent to be V-shaped.

A pixel electrode 71 and a common electrode 72, each of which serves as a liquid crystal driving electrode for generating liquid crystal driving electric field, are arranged in each pixel region. The pixel electrode 71 and the common electrode 72 are made of transparent conductive material.

In each pixel region, as shown in FIG. 8, the pixel electrode 71 is connected electrically and mechanically to the source electrode 42 of the corresponding TFT 45 and is laterally ladder-shaped. The part of the pixel electrode 71 that constitutes each rung of the ladder (i.e., the rung part of the pixel electrode 71) is bent to be V-shaped along the drain bus lines 56. The common electrode 72 is connected electrically and mechanically to the two common bus lines 52 located at the upper and lower positions of the pixel region and is laterally ladder-shaped also. The part of the common electrode 72 that constitutes each rung of the ladder (i.e., the rung part of the common electrode 72) is bent to be V-shaped along the drain bus lines 56.

The pixel electrode 71 comprises the three V-shaped rung parts and the common electrode 72 comprises the four V-shaped rung parts. The pixel electrode 71 and the common electrode 72 are arranged in such a way that their rung parts are alternately aligned at equal intervals along the lateral direction of FIG. 8. The bends of these V-shaped rung parts are aligned on the same straight line. This straight line serves as the boundary line that divides the pixel region into the first sub-region 1 placed at the upper position of FIG. 8 and the second sub-region 2 placed at the lower position thereof. In this way, the pixel region is divided into the first and second sub-regions 1 and 2 by the border line located on the bends of the rung parts of the pixel and common electrodes 71 and 72. The rung parts of the pixel electrode 71 and those of the common electrode 72 are inclined clockwise by a predetermined angle with respect to the vertical direction of FIG. 8 in the first sub-region 1. In the second sub-region 2, the rung parts of the pixel electrode 71 and those of the common electrode 72 are inclined counterclockwise by the same angle with respect to the vertical direction of FIG. 8.

Figure 9:
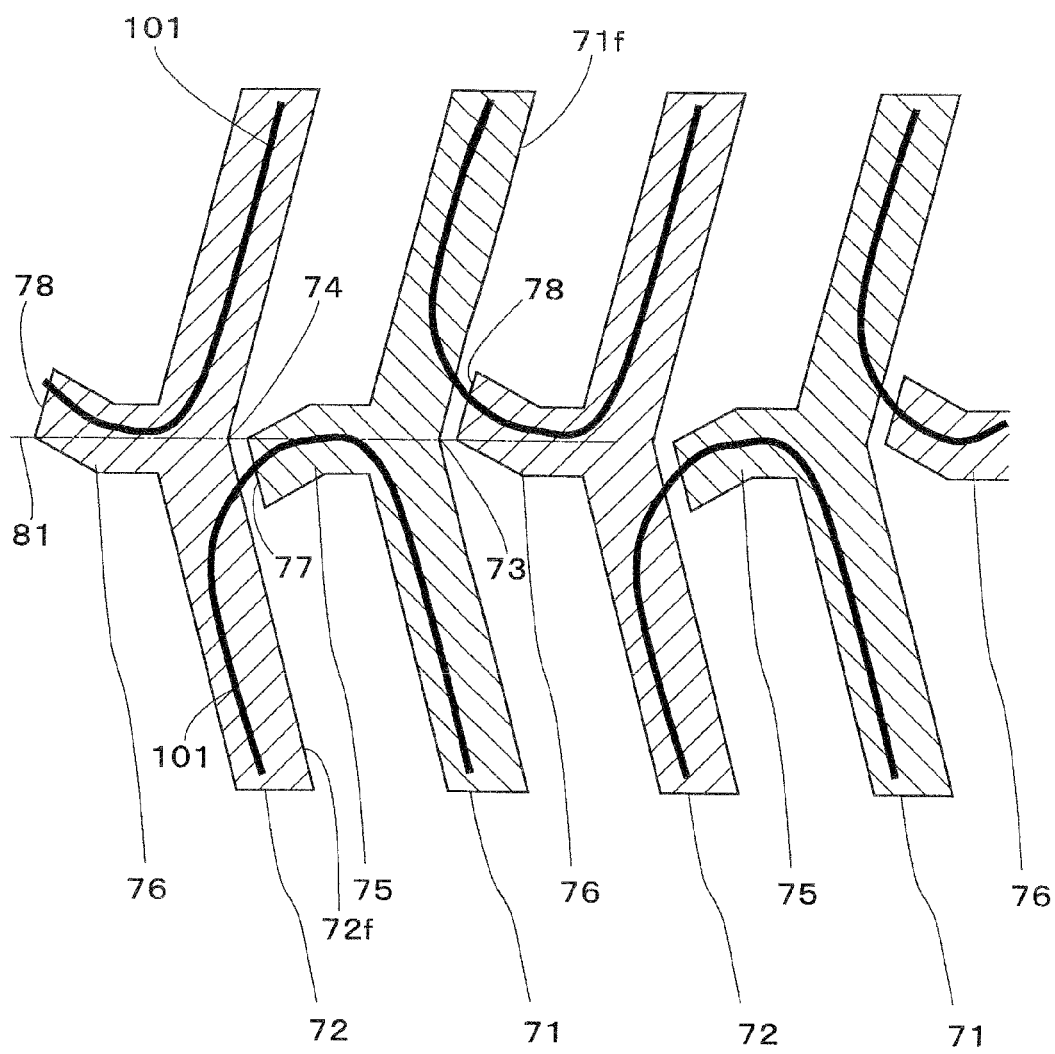
FIG. 9 is an enlarged partial plan view showing the detailed structure of the vicinities of the boundary stabilization electrodes provided at the pixel electrode and the common electrode on the active-matrix substrate of the LCD device according to the first embodiment of the invention.

As shown in FIG. 9 in detail, a whisker-shaped boundary stabilization electrode 75 is formed at the bend 73 of the V-shaped rung part of each pixel electrode 71. The boundary stabilization electrode 75 protrudes from the bend 73 toward the left side of FIG. 9 (i.e., the side to which the rung parts are bent) along the line of symmetry 81 drawn on the boundary between the first and second subregions 1 and 2. The base of the boundary stabilization electrode 75 is located on the line of symmetry 81 and is elongated parallel to the same line 81. The boundary stabilization electrode 75 except for its base is bent obliquely from the vicinity of its middle part toward the lower side of FIG. 9 (i.e., the second sub-region 2) in such a way as to deviate from the line 81. Here, the boundary stabilization electrode 75 is united with the pixel electrode 71 as a protrusion that protrudes from the bend 73 thereof. As a result, the top edge 77 of the boundary stabilization electrode 75 is shifted in position to the side of the second sub-region 2 from the line 81 (or the bend 73).

On the other hand, a whisker-shaped boundary stabilization electrode 76 is formed at the bend 74 of the V-shaped rung part of each common electrode 72. Similar to the boundary stabilization electrode 75, the boundary stabilization electrode 76 protrudes from the bend 74 toward the left side of FIG. 9 (i.e., the side to which the rung parts are bent) along the line of symmetry 81. The base of the boundary stabilization electrode 76 is located on the line 81 and is elongated parallel to the same line 81. The boundary stabilization electrode 76 except for its base is bent obliquely from the vicinity of its middle part toward the upper side of FIG. 9 (i.e., the first sub-region 1) in such a way as to deviate from the line 81. Here, the boundary stabilization electrode 76 is united with the common electrode 72 as a protrusion that protrudes from the bend 74 thereof. As a result, the top edge 78 of the boundary stabilization electrode 76 is shifted in position to the side of the first sub-region 1 from the line 81 (or the bend 74). In this way, the bending direction of the bending part of the boundary stabilization electrode 76 is the reverse of that of the boundary stabilization electrode 75. The bending angle of the boundary stabilization electrode 76 is the same as that of the boundary stabilization electrode 75. This means that the boundary stabilization electrode 76 is the reverse of the boundary stabilization electrode 75.

As described above, the boundary stabilization electrode 76 of the common electrode 72, which is bent obliquely to the upper side of FIG. 9 (i.e., the side of the first sub-region 1) with respect to the line of symmetry 81 drawn on the boundary of the first and second subregions 1 and 2, and the boundary stabilization electrode 75 of the pixel electrode 71, which is bent obliquely to the lower side of FIG. 9 (i.e., the side of the second sub-region 2) with respect to the line 81, are alternately arranged along the line 81.

Moreover, as seen from FIG. 9, the top edge 77 of the boundary stabilization electrode 75 of the pixel electrode 71 is close to the bottom edge 72*f* of the adjoining rung part of the common electrode 71 in the second sub-region 2 and is approximately parallel to the said bottom edge 72*f*. Similarly, the top edge 78 of the boundary stabilization electrode 76 of the common electrode 72 is close to the bottom edge 71*f* of the adjoining rung part of the pixel electrode 71 in the first sub-region 1 and is approximately parallel to the said bottom edge 71*f*.

The top corners (i.e., the points) of the boundary stabilization electrodes 75 and 76 are located on the line of symmetry 81. In other words, the top corners of the electrodes 75 and 76 are aligned on the line 81.

The corner of the bottom edge 71*f*, which is formed at the bend 73 of the pixel electrode 71, and the corner of the bottom edge 72*f*, which is formed at the bend 74 of the common electrode 72, are alternately located on the line of symmetry 81.

With the structure of the LCD device according to the first embodiment shown in FIGS. 8 and 9, as explained above, the V-type ladder-shaped pixel electrode 71 and the V-type ladder-shaped common electrode 72 are arranged in each pixel region, thereby dividing the pixel region into the first sub-region 1 and the second sub-region 2. Therefore, when a voltage is applied, liquid crystal driving electric field is generated along a direction slightly inclined clockwise with respect to the boundary (i.e., the line of symmetry 81) in the first sub-region 1 and at the same time, it is generated along a direction slightly inclined counterclockwise with respect to the same boundary in the second sub-region 2. Accordingly, the liquid crystal molecules 21, which have been uniformly initial-aligned along the longitudinal (or vertical) direction of FIG. 8 in the state where no electric field is applied, are rotated counterclockwise in the first sub-region 1 and clockwise in the second sub-region 2 by the liquid crystal driving electric field applied. In this way, the rotation directions of the liquid crystal molecules 21 in the first and second sub-regions 1 and 2 are made different from each other, and as a result, the display coloring phenomenon dependent on the viewing angle change can be suppressed.

Moreover, with the LCD device according to the first embodiment of the invention, the boundary stabilization electrode 75 of the pixel electrode 71 (which is bent downward) and the boundary stabilization electrode 76 of the common electrode 72 (which is bent upward) are alternately arranged on the boundary between the first and second sub-regions 1 and 2 (in other words, on the line of symmetry 81 of the boundary stabilization electrodes 75 and 76). For this reason, the disclination line 101 running over the boundary stabilization electrode 75 is likely to curve downward along the bending shape (i.e., deviation in shape) of the said electrode 75 and the disclination line 101 running over the boundary stabilization electrode 76 is likely to curve upward along the bending shape (i.e., deviation in shape) of the said electrode 76. As a result, in the case where no mechanical deformation is applied to the display screen of the LCD device of the first embodiment, the disclination lines 101 curving upward and those curving downward are alternately arranged along the line of symmetry 81, as shown in FIG. 9.

In the case where a mechanical deformation such as a press with a finger is applied to the display screen, the disclination lines 101 running along the bending shape of the boundary stabilization electrodes 75 or 76 may deviate from the state of FIG. 9 temporarily. However, the disclination lines 101 are inclined to return to the deviated side of the boundary stabilization electrodes 75 or 76 and as a result, these lines 101 are restored to their original ones in a short time, e.g., immediately after the departure of the finger or in several tens of seconds at the longest and become stable. Accordingly, the disclination lines 101 can be held stably even if abnormally displayed areas are caused on the display screen by mechanical deformation such as a press with a finger.

Figure 17A:
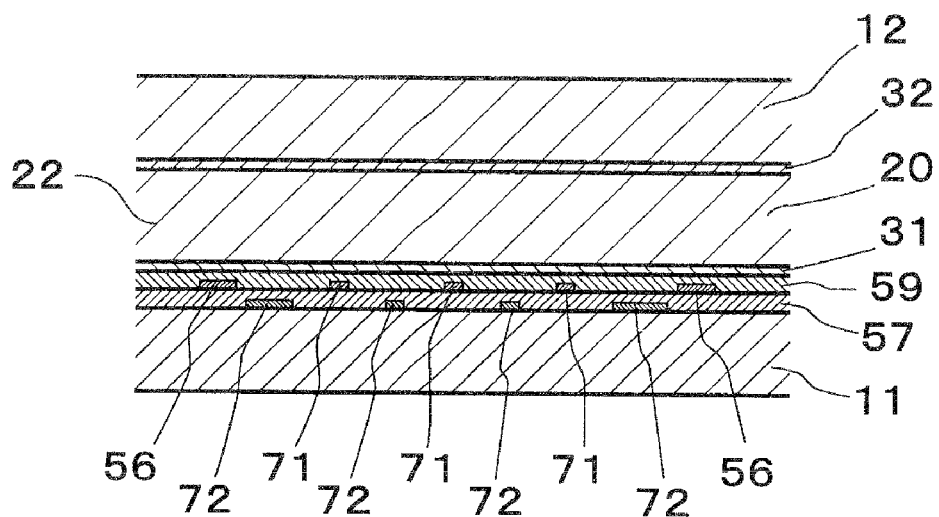
FIG. 17A is a cross-sectional view along the line XVIIA-XVIIA in FIG. 8, which shows the structure of the LCD device according to the first embodiment of the invention shown in FIG. 8.
Figure 17B:
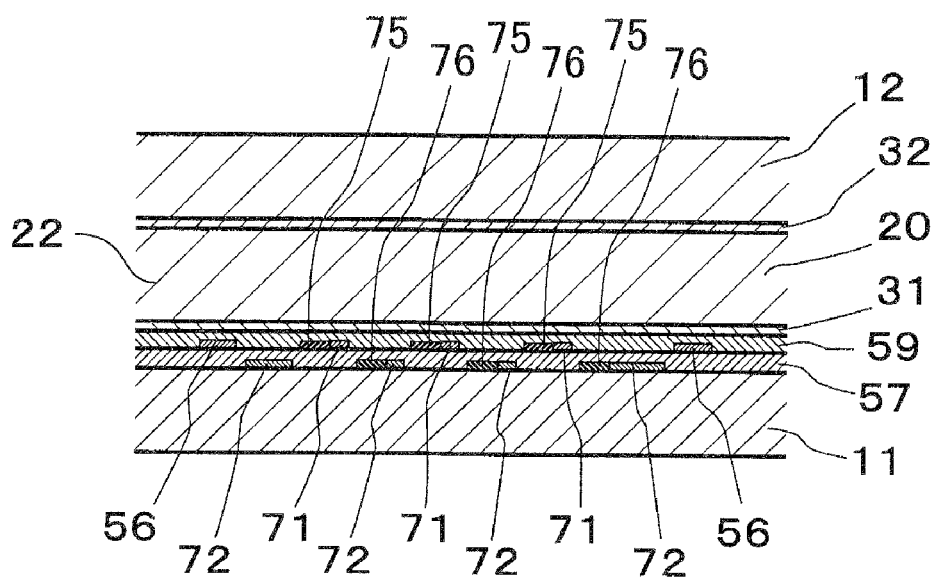
FIG. 17B is a cross-sectional view along the line XVIIB-XVIIB in FIG. 8, which shows the structure of the LCD device according to the first embodiment of the invention shown in FIG. 8.

The cross-sectional structure of the active-matrix substrate of the LCD device according to the first embodiment is shown in FIGS. 17A and 17B.

As shown in FIGS. 17A and 17B, the common electrodes 72 are formed directly on the surface of a transparent plate 11 and covered with an interlayer insulating film 57 formed on the surface of the plate 11. Although not shown in FIGS. 17A and 17B, the gate bus lines 55, the common bus lines 52, and the gate electrodes of the TFTs 45 are also formed directly on the surface of the plate 11 and covered with the interlayer insulating film 57. The pixel electrodes 71 and the drain bus lines 56 are formed on the interlayer insulating film 57. Therefore, the pixel electrodes 71 and the drain bus lines 56 are electrically insulated from the common electrodes 72, the gate bus lines 55, the common bus lines 52, and the gate electrodes by the interlayer insulating film 57.

The pixel electrodes 71 and the common electrodes 72 are overlapped with each other in such a way that the interlayer insulating film 57 intervene between them, thereby forming additional capacitors by the respective overlapped parts of the pixel and common electrodes 71 and 72.

Although not shown in FIGS. 17A and 17B, the source electrodes 42, the drain electrodes 44, and the semiconductor films 43 of the TFTs 45 are also formed on the interlayer insulating film 57. Therefore, the source electrodes 42, the drain electrodes 44, and the semiconductor films 43 are electrically insulated from the common electrodes 72, the gate bus lines 55, the common bus lines 52, and the gate electrodes by the interlayer insulating film 57.

A protective insulating film 59 is formed on the interlayer insulating film 57. The pixel electrodes 71, the drain bus lines 56, and the source electrodes 42, the drain electrodes 44 and the semiconductor films 43 of the TFT 45, all of which are located on the interlayer insulating film 57, are covered with the protective insulating film 59.

An alignment film 31 made of an organic polymer is formed on the protective insulating film 57. The surface of the alignment film 31 has been subject to a predetermined aligning treatment.

The cross-sectional structure of the opposite substrate of the LCD device according to the first embodiment, which is coupled with the above-described active-matrix substrate, is shown in FIGS. 17A and 17B.

A color filter (not shown) including three primary colors red (R) green (G), and blue (B), is selectively formed on the surface of a transparent plate 12 in the corresponding regions to the pixel regions. A black matrix (not shown) for blocking light is formed on the surface of the plate 12 in the area excluding the corresponding regions to the pixel regions. A planarization film (not shown) is formed on the color filter and the black matrix. Moreover, columnar spacers (not shown) are formed on the planarization film. An alignment film 32 made of an organic polymer is formed on the planarization film so as to cover the spacers. The surface of the alignment film 32 has been subject to a predetermined aligning treatment.

The active-matrix substrate and the opposite substrate each having the above-described structures are superposed on each other at a predetermined gap, where the surfaces of the substrates on which the alignment films 31 and 32 are respectively placed are faced inward. A liquid crystal material is confined in the gap between the active-matrix and opposite substrates, forming a liquid crystal layer 22. A pair of polarizer plates (not shown) is arranged on the outer surfaces of the active-matrix and opposite substrates, respectively.

The penetration axes of the pair of polarizer plates are intersected at right angles with each other. The penetration axis of one of the polarizer plates is in accordance with the initial alignment direction (i.e., the alignment direction when no electric field is applied) of the liquid crystal molecules 21 existing in the liquid crystal layer 22.

The LCD device according to the first embodiment with the above-described structure is fabricated, for example, in the following way.

Regarding the active-matrix substrate, first, a Cr film is formed on the surface of the transparent plate 11 made of glass and patterned, forming the gate bus lines 55 and the common electrodes 72. Next, a $SiN_x$ film is formed on the surface of the plate 11 to cover the gate bus lines 55 and the common electrodes 72, resulting in the interlayer insulating film 57. Subsequently, a semiconductor film, which is used for forming the active layers of the TFTs 45, is formed on the interlayer insulating film 57 and patterned, forming the island-shaped semiconductor films 43 at the positions that are overlaid on the corresponding gate bus lines 55 in such a way that the interlayer insulating film 57 intervenes between them. Moreover, a Cr film is formed on the interlayer insulating film 57 and patterned, forming the source and drain electrodes 42 and 44 of the TFTs 45, the drain bus lines 56, and the pixel electrodes 71. Following this, a $SiN_x$ film is formed on the interlayer insulating film 57 to cover the source and drain electrodes 42 and 44, the drain bus lines 56, and the pixel electrodes 71, resulting in the protective insulating film 59. In this way, the active-matrix substrate is fabricated.

Regarding the opposite substrate, first, the color filter and the black matrix are selectively formed on the surface of the transparent plate 12 made of glass. Thereafter, the planarization film is formed to cover the color filter and the black matrix. Then, the columnar spacers are formed on the planarization film. In this way, the opposite substrate is fabricated.

Figure 2:
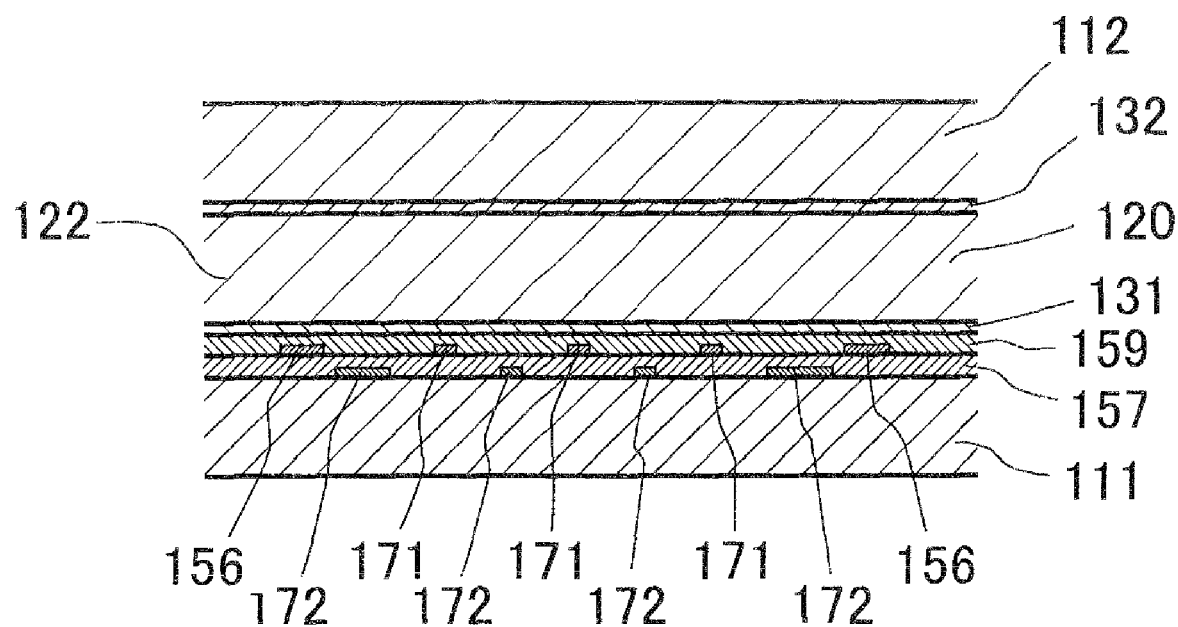
FIG. 2 is a cross-sectional view along the line II-II in FIG. 1, which shows the structure of the related-art LCD device of FIG. 1.

Following this, the alignment films 31 and 32, which are made of polyimide, are respectively formed on the innermost surface of the active-matrix substrate and the innermost surface of the opposite substrate fabricated respectively in the above-described manners. The surfaces of the alignment films 31 and 32 thus formed are uniformly subjected to the predetermined aligning treatments, respectively. Thereafter, the active-matrix substrate and the opposite substrate are superposed on each other to form a gap of 40 μm between them and then, in a vacuum chamber (not shown), a nematic liquid crystal material whose refractive index anisotropy is 0.075 is injected into the gap between the two substrates. Finally, the polarizer plates are respectively adhered onto the outer surfaces (backs) of the substrates. As a result, the LCD panel with the structure of FIGS. 1 and 2 is fabricated.

A driver LSI and a backlight unit are mounted on the LCD panel thus fabricated. As a result, the LCD device according to the first embodiment is completed.

With the lateral electric field type LCD device according to the first embodiment, as explained above, the ladder-shaped pixel electrode 71 and the ladder-shaped common electrode 72 (each of which is the liquid crystal driving electrode formed on the active-matrix substrate) comprise respectively the bends 73 and 74 formed at their rung parts in each pixel region. The boundary stabilization electrode 75 is formed at the bend 73 of the pixel electrode 71. The boundary stabilization electrode 76 is formed at the bend 74 of the common electrode 72. The top end of the boundary stabilization electrode 75 is shifted in position to the side of the second sub-region 2 from the line of symmetry 81. The top end of the boundary stabilization electrode 76 is shifted in position to the side of the first sub-region 1 from the same line 81.

Therefore, as shown in FIG. 9, the disclination line 101 running over the top end of the boundary stabilization electrode 75 has a tendency to curve toward the second sub-region 2 according to the positional shift of the top end of the said electrode 75 (in other words, the deviation in shape of the said electrode 75). Similarly, the disclination line 101 running over the top end of the boundary stabilization electrode 76 has a tendency to curve toward the first sub-region 1 according to the positional shift of the top end of the said electrode 76 (in other words, the deviation in shape of the said electrode 76). For this reason, the disclination line 101 running over the boundary stabilization electrode 75 is likely to curve downward along the bending shape (i.e., deviation in shape) of the said electrode 75, and the disclination line 101 running over the boundary stabilization electrode 76 is likely to curve upward along the bending shape (i.e., deviation in shape) of the said electrode 76. As a result, in the case where no mechanical deformation is applied, the disclination lines 101 curving upward and those curving downward are alternately arranged along the line of symmetry 81, as shown in FIG. 9.

In the case where a mechanical deformation such as a press with a finger is applied to the display screen of the LCD device of the first embodiment, even if the disclination lines 101 running along the bending shape (i.e., deviation in shape) of the boundary stabilization electrodes 75 or 76 sways off from the state of FIG. 9 temporarily, the disclination lines 101 are inclined to return to the deviated side of the boundary stabilization electrodes 75 or 76. This means that the disclination lines 101 are restored to their original ones shown in FIG. 9 in a short time and become stable. Accordingly, images can be displayed uniformly and stably in such a way that abnormally displayed areas caused by mechanical deformation such as a press with a finger do not remain on the display screen for a long time.

In particular, even a slight finger-pressed mark observed when the user looks at the display screen obliquely, which has not been solved anyhow so far, can be suppressed completely.

Second Embodiment

Figure 10:
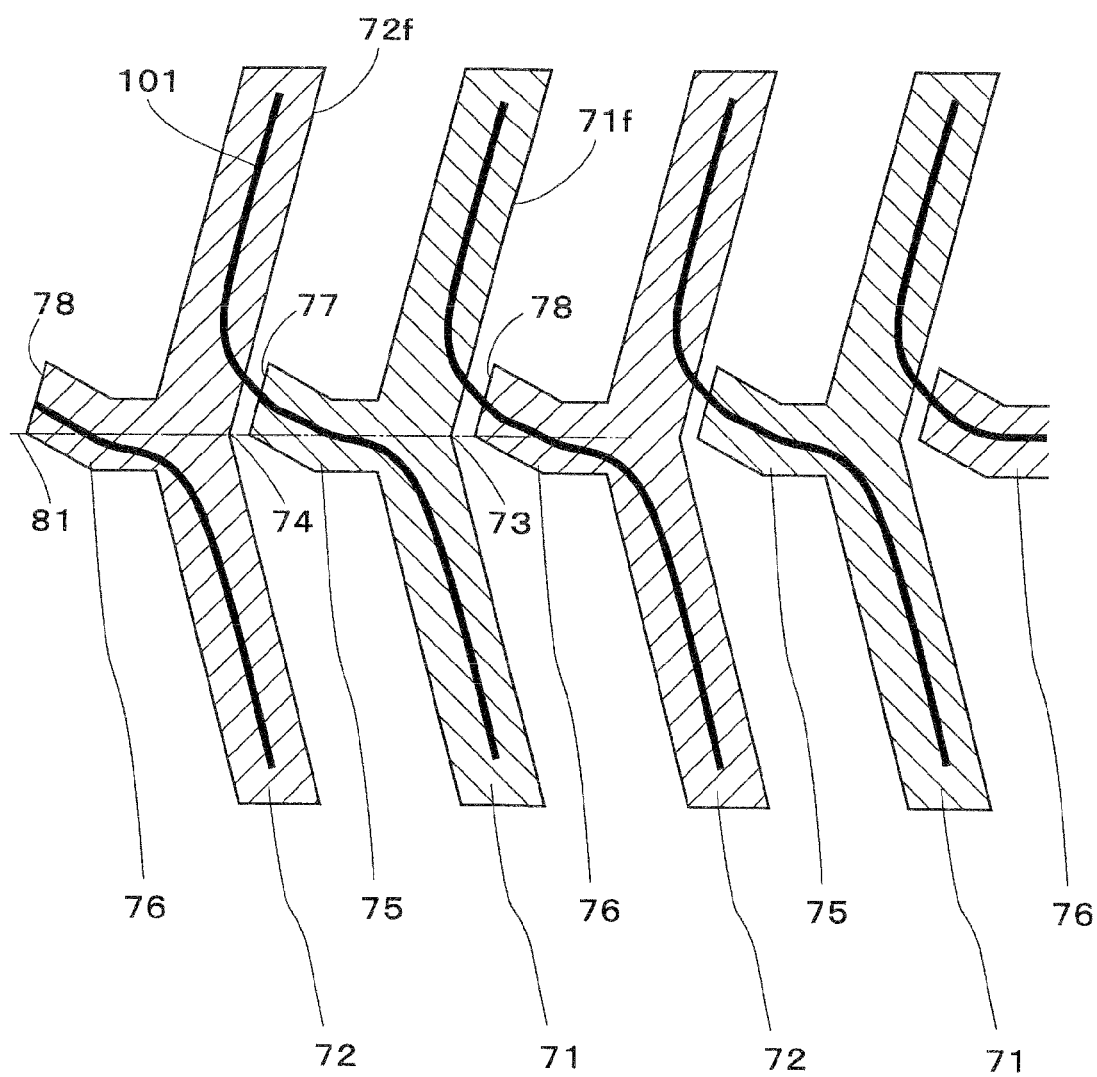
FIG. 10 is an enlarged partial plan view showing the detailed structure of the vicinities of the boundary stabilization electrodes provided at the pixel electrode and the common electrode on the active-matrix substrate of a lateral electric field type LCD device according to the second embodiment of the invention.

A lateral electric field type LCD device according to the second embodiment of the invention is shown in FIG. 10.

FIG. 10 shows the detailed structure of the vicinities of the boundary stabilization electrodes 75 and 76 formed respectively at the bends 73 and 74 of the pixel electrodes 71 and the common electrodes 72, which are located on the active-matrix substrate of this LCD device. In this second embodiment, the same reference numerals as used in the first embodiment are attached to the same structural elements.

The structure of the LCD device according to the second embodiment is the same as that of the LCD device according to the above-described first embodiment except that not only the whisker-shaped boundary stabilization electrodes 76 of the common electrodes 72 but also the whisker-shaped boundary stabilization electrodes 75 of the pixel electrodes 71 are bent to the upper side of FIG. 10 (i.e., to the side of the first sub-region 1).

Specifically, as shown in FIG. 10, the whisker-shaped boundary stabilization electrode 75, which is formed at the bend 73 of the V-shaped rung part of each pixel electrode 71, protrudes from the bend 73 toward the left side of FIG. 10 (i.e., the side to which the rung part is bent) along the line of symmetry 81 drawn on the boundary of the first and second sub-regions 1 and 2. The base of the boundary stabilization electrode 75 is located on the line of symmetry 81 and is elongated parallel to the same line 81. The boundary stabilization electrode 75 is bent obliquely from the vicinity of its middle part toward the upper side of FIG. 10 (i.e., the side where the first sub-region 1 is located) in such a way as to deviate from the line 81. Here, the boundary stabilization electrode 75 is united with the pixel electrode 71 as a protrusion that protrudes from the bend 73 thereof. As a result, the top edge 77 of the boundary stabilization electrode 75 is shifted to the side of the first sub-region 1 from the line 81 (or the bend 73).

The whisker-shaped boundary stabilization electrode 76, which is formed at the bend 74 of the V-shaped rung part of each common electrode 72, protrudes from the bend 74 toward the left side of FIG. 10 along the line of symmetry 81. The base of the boundary stabilization electrode 76 is located on the line 81 and is elongated parallel to the same line 81. The boundary stabilization electrode 76 is bent obliquely from the vicinity of its middle part toward the upper side of FIG. 10. Here, the boundary stabilization electrode 76 is united with the common electrode 72 as a protrusion that protrudes from the bend 74 thereof. As a result, the top edge 78 of the boundary stabilization electrode 76 is shifted to the side of the first subregion 1 from the line 81 (or the bend 74). This means that the bending direction of the boundary stabilization electrode 76 other than its base is the same as that of the boundary stabilization electrode 75. The bending angle of the boundary stabilization electrode 76 is the same as that of the boundary stabilization electrode 75. Thus, the boundary stabilization electrode 76 is the reverse of the boundary stabilization electrode 75.

As described above, both of the boundary stabilization electrode 76 of the common electrode 72 and the boundary stabilization electrode 75 of the pixel electrode 71, which are alternately arranged along the line of symmetry 81, are bent obliquely to the upper side of FIG. 10 (i.e., the side of the first sub-region 1) with respect to the line of symmetry 81.

Moreover, the top edge 77 of the boundary stabilization electrode 75 of the pixel electrode 71 is close to the bottom edge 72$f$ of the adjoining common electrode 71 in the second sub-region 2 and is approximately parallel to the said bottom edge 72$f$. The top edge 78 of the boundary stabilization electrode 76 of the common electrode 72 is close to the bottom edge 71$f$ of the adjoining pixel electrode 71 in the second sub-region 2 and is approximately parallel to the said bottom edge 71$f$.

The top corners (i.e., the points) of the boundary stabilization electrodes 75 and 76 are located on the line of symmetry 81. In other words, the top corners of the electrodes 75 and 76 are alternately aligned on the line 81.

With the structure of the LCD device according to the second embodiment shown in FIG. 10, as explained above, both of the boundary stabilization electrode 75 of the pixel electrode 71 and the boundary stabilization electrode 76 of the common electrode 72 are bent upward to the side of the first sub-region 1 and therefore, the disclination line 101 running over the boundary stabilization electrode 75 and the disclination line 101 running over the boundary stabilization electrode 76 are likely to curve upward along the bending shape (i.e., deviation in shape) of the electrodes 75 and 76. As a result, in the case where no mechanical deformation is applied, the disclination lines 101 curving upward are arranged along the line of symmetry 81, as shown in FIG. 10.

In the case where a mechanical deformation such as a press with a finger is applied to the display screen of the LCD device of the second embodiment, even if the disclination lines 101 sway off from the state of FIG. 10 temporarily, the said disclination lines 101 are inclined to return to the deviated side of the boundary stabilization electrodes 75 and 76 and as a result, the said disclination lines 101 are restored to their original ones in a short time and become stable. Consequently, even if abnormally displayed areas are caused on the display screen by mechanical deformation such as a press with a finger, images can be displayed uniformly and stably in such a way that the abnormally displayed areas do not remain on the display screen for a long time.

In particular, even a slight finger-pressed mark observed when the user looks at the display screen obliquely, which has not been solved anyhow so far, can be suppressed completely.

In addition, opposite to the structure shown in FIG. 10, it is needless to say that both of the boundary stabilization electrode 75 of the pixel electrode 71 and the boundary stabilization electrode 76 of the common electrode 72 may be bent obliquely to the lower side of FIG. 10 (i.e., the side of the second sub-region 2) with respect to the line of symmetry 81.

Third Embodiment

Figure 11:
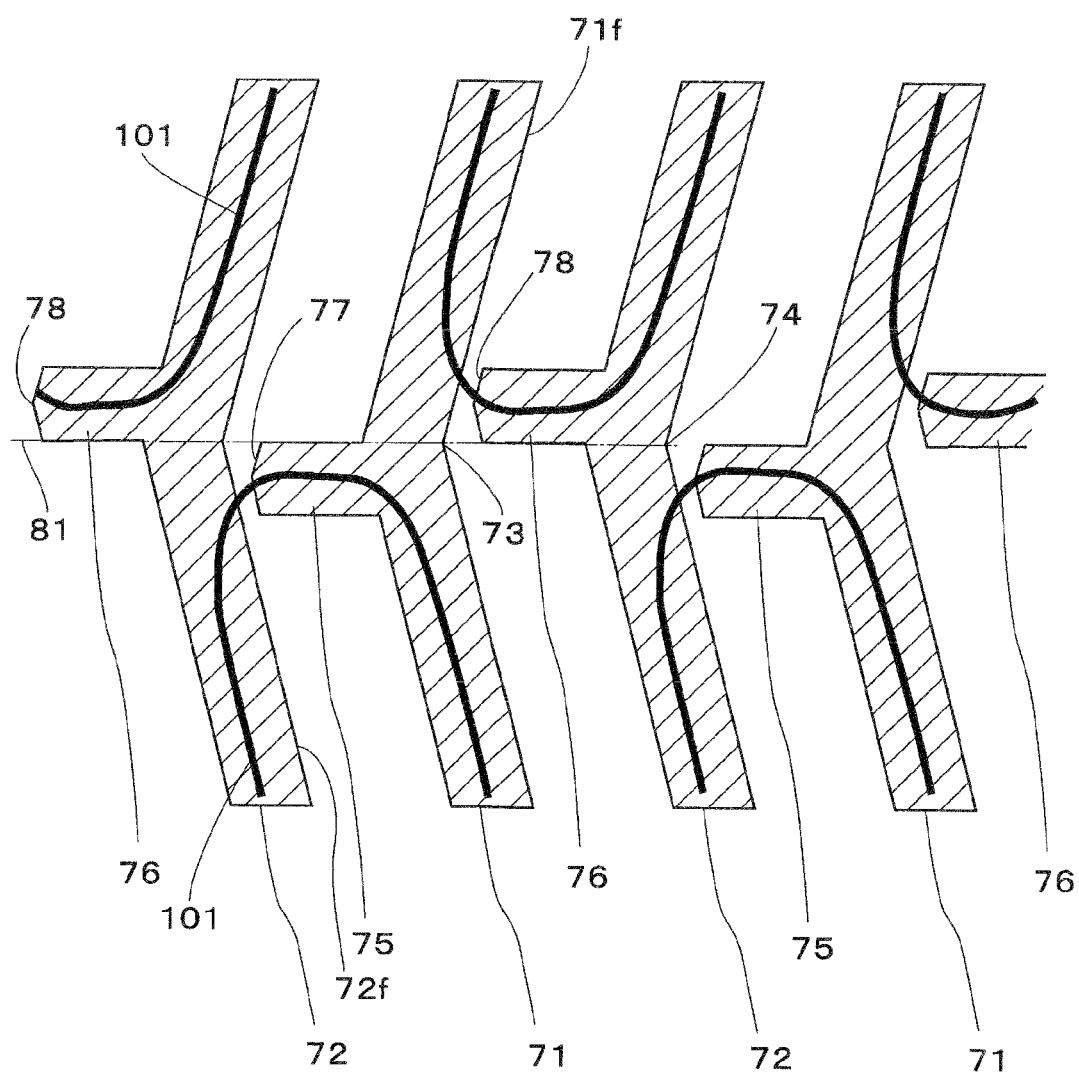
FIG. 11 is an enlarged partial plan view showing the detailed structure of the vicinities of the boundary stabilization electrodes provided at the pixel electrode and the common electrode on the active-matrix substrate of a lateral electric field type LCD device according to the third embodiment of the invention.

A lateral electric field type LCD device according to the third embodiment of the invention is shown in FIG. 11.

FIG. 11 shows the detailed structure of the vicinities of the boundary stabilization electrodes 75 and 76 formed respectively at the bends 73 and 74 of the pixel electrodes 71 and the common electrodes 72, which are located on the active-matrix substrate of this LCD device. In this third embodiment, the same reference numerals as used in the first embodiment are attached to the same structural elements.

The structure of the LCD device according to the third embodiment is the same as that of the LCD device according to the above-described first embodiment except that the whisker-shaped boundary stabilization electrodes 75 and 76 are not bent in such a manner as that of the above-described first or second embodiment but are entirely shifted in position to the upper side (i.e., the side of the first sub-region 1) or the lower side (i.e., the side of the second sub-region 2).

Specifically, as shown in FIG. 11, the boundary stabilization electrode 75, which is formed at the bend 73 of the rung part of each pixel electrode 71, protrudes from the bend 73 toward the left side of FIG. 11 (i.e., the side to which the rung part is bent) parallel to the line of symmetry 81. The entire boundary stabilization electrode 75 is shifted in position to the lower side (i.e., the second sub-region 2) with respect to the line 81. The boundary stabilization electrode 75 is united with the pixel electrode 71 as a protrusion that protrudes from the bend 73 thereof. As a result, the boundary stabilization electrode 75 in its entirety (not only the top edge 77 of the boundary stabilization electrode 75) is included in the second sub-region 2).

On the other hand, similar to the boundary stabilization electrode 75, the boundary stabilization electrode 76, which is formed at the bend 74 of the rung part of each common electrode 72, protrudes from the bend 74 toward the left side of FIG. 11 along the line of symmetry 81. The entire boundary stabilization electrode 76 is shifted in position to the upper side (i.e., the first sub-region 1) parallel to the line of symmetry 81. The boundary stabilization electrode 76 is united with the common electrode 72 as a protrusion that protrudes from the bend 74 thereof. As a result, the boundary stabilization electrode 76 in its entirety (not only the top edge 78 of the boundary stabilization electrode 76) is included in the first sub-region 1. This means that the shifting direction of the boundary stabilization electrode 76 is the reverse of the boundary stabilization electrode 75. The shifting distance of the boundary stabilization electrode 76 is equal to that of the boundary stabilization electrode 75. Thus, the boundary stabilization electrode 76 is the reverse of the boundary stabilization electrode 75.

In this way, the boundary stabilization electrode 76 of the common electrode 72 shifted upward with respect to the line of symmetry 81 and the boundary stabilization electrode 75 of the pixel electrode 71 shifted downward with respect to the line 81 are alternately arranged along the line 81.

Moreover, the top edge 77 of the boundary stabilization electrode 75 of the pixel electrode 71 is close to the bottom edge 72f of the adjoining common electrode 71 in the second sub-region 2. The top edge 78 of the boundary stabilization electrode 76 of the common electrode 72 is close to the bottom edge 71f of the adjoining pixel electrode 71 in the first sub-region 1. The top edge 77 of the boundary stabilization electrode 75 is approximately V-shaped similar to the rung part of the pixel electrode 71. The top edge 78 of the boundary stabilization electrode 76 is approximately V-shaped similar to the rung part of the common electrode 72.

The upper side edges of the boundary stabilization electrodes 75 and the lower side edges of the boundary stabilization electrodes 76 are located on the line of symmetry 81. In other words, the upper side edges of the electrodes 75 and the lower side edges of the electrodes 76 are alternately aligned on the line 81.

With the structure of the LCD device according to the third embodiment shown in FIG. 11, as explained above, the entire boundary stabilization electrode 75 of the pixel electrode 71 is shifted in position downward (i.e., to the second sub-region 2) and the entire boundary stabilization electrode 76 of the common electrode 72 is shifted in position upward (i.e., to the first sub-region 1) with respect to the line of symmetry 81. Therefore, the disclination line 101 running over the boundary stabilization electrode 75 is likely to curve downward according to the positional sift of the electrode 75, and the disclination line 101 running over the boundary stabilization electrode 76 is likely to curve upward according to the positional sift of the electrode 76. As a result, in the case where no mechanical deformation is applied, the disclination lines 101 curving downward and the disclination lines 101 curving upward are alternately arranged along the line of symmetry 81, as shown in FIG. 11.

In the case where a mechanical deformation such as a press with a finger is applied to the display screen of the LCD device of the third embodiment, even if the disclination lines 101 sway off from the state of FIG. 11 temporarily, the disclination lines 101 are inclined to return to the shifted side of the boundary stabilization electrodes 75 or 76 and as a result, the disclination lines 101 are restored to their original ones shown in FIG. 11 in a short time and become stable. Consequently, even if abnormally displayed areas are caused on the display screen by mechanical deformation such as a press with a finger, images can be displayed uniformly and stably in such a way that the abnormally displayed areas do not remain on the display screen for a long time.

In particular, even a slight finger-pressed mark observed when the user looks at the display screen obliquely, which has not been solved anyhow so far, can be suppressed completely.

In addition, it is needless to say that both of the boundary stabilization electrodes 75 of the pixel electrodes 71 and the boundary stabilization electrodes 76 of the common electrodes 72 may be shifted to the upper side of FIG. 11 (i.e., to the first sub-region 1) or the lower side of FIG. 11 (i.e., to the second sub-region 2) with respect to the line of symmetry 81.

Fourth Embodiment

Figure 12:
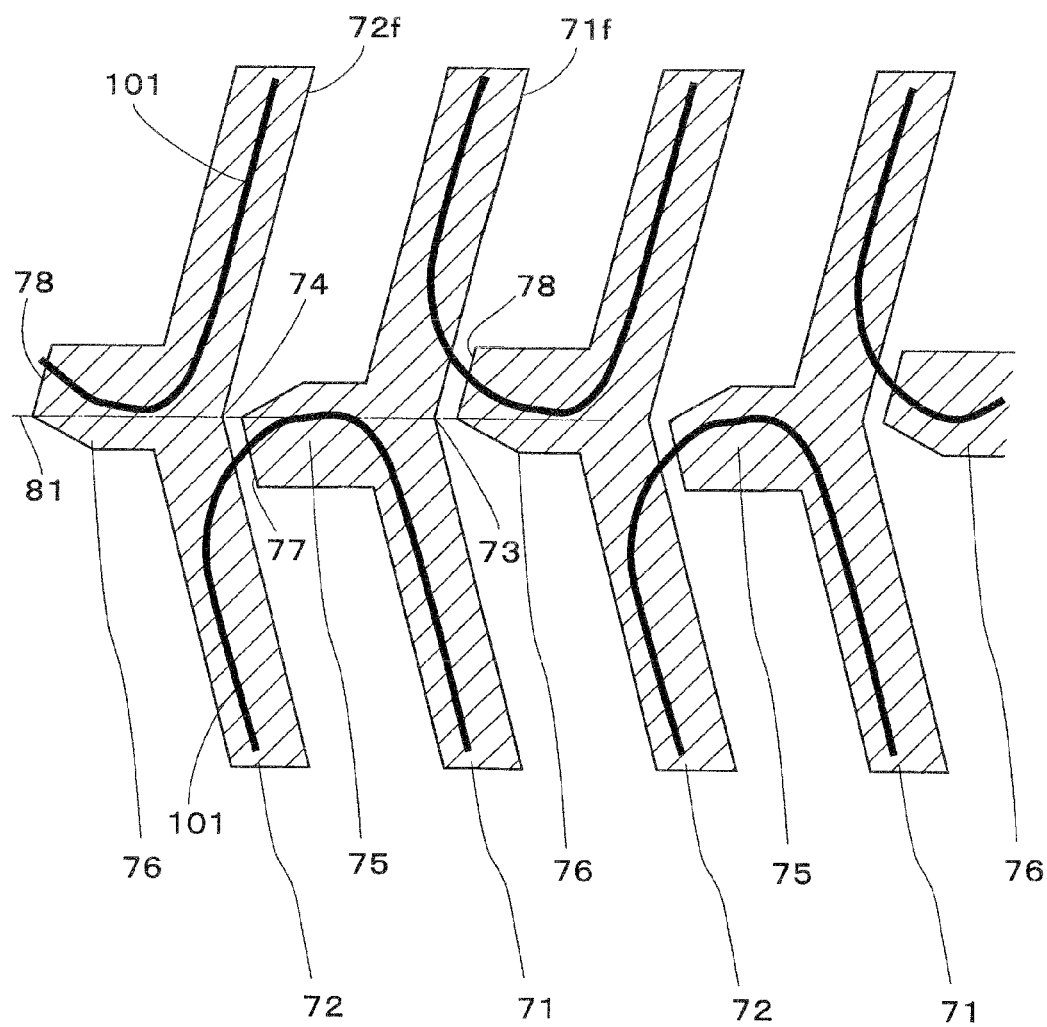
FIG. 12 is an enlarged partial plan view showing the detailed structure of the vicinities of the boundary stabilization electrodes provided at the pixel electrode and the common electrode on the active-matrix substrate of a lateral electric field type TCD device according to the fourth embodiment of the invention.

A lateral electric field type LCD device according to the third embodiment of the invention is shown in FIG. 12.

FIG. 12 shows the detailed structure of the vicinities of the boundary stabilization electrodes 75 and 76 formed respectively on the bends 73 and 74 of the pixel electrodes 71 and the common electrodes 72, which are located on the active-matrix substrate of this LCD device. In this fourth embodiment, the same reference numerals as used in the first embodiment are attached to the same structural elements.

The structure of the LCD device according to the fourth embodiment corresponds to the combination of the structures of the LCD devices according to the above-described first and third embodiments.

Specifically, as shown in FIG. 12, the boundary stabilization electrode 75, which is formed at the bend 73 of the rung part of each pixel electrode 71, protrudes from the bend 73 toward the left side (i.e., the side to which the rung part is bent) of FIG. 12 along the line of symmetry 81 and at the same time, the boundary stabilization electrode 75 in its entirety is translated downward (i.e., toward the second sub-region 2). The boundary stabilization electrode 75 is united with the pixel electrode 71 as a protrusion that protrudes from the bend 73 thereof. As a result, most of the boundary stabilization electrode 75 is located in the second subregion 2 and the remainder of the boundary stabilization electrode 75 is located in the first sub-region 1.

On the other hand, the boundary stabilization electrode 76, which is formed at the bend 74 of the rung part of each common electrode 72, protrudes from the bend 74 toward the left side (i.e., the side to which the rung part is bent) of FIG. 12 along the line of symmetry 81 and at the same time, the boundary stabilization electrode 76 in its entirety is translated upward (i.e., toward the first sub-region 1). The boundary stabilization electrode 76 is united with the common electrode 72 as a protrusion that protrudes from the bend 74 thereof. As a result, most of the boundary stabilization electrode 76 is located in the first sub-region 1 and the remainder of the boundary stabilization electrode 76 is located in the second sub-region 2.

The translation distance of the boundary stabilization electrode 75 is equal to that of the boundary stabilization electrode 76. The shape of the boundary stabilization electrode 75 is the reverse of that of the boundary stabilization electrode 76. Thus, the boundary stabilization electrode 76 is the reverse of the boundary stabilization electrode 75.

In this way, the boundary stabilization electrode 76 of the common electrode 72 translated upward with respect to the line of symmetry 81 and the boundary stabilization electrode 75 of the pixel electrode 71 translated downward with respect to the line 81 are alternately arranged along the line 81.

Moreover, the top edge 77 of the boundary stabilization electrode 75 of the pixel electrode 71 is close to the bottom edge 72$f$ of the adjoining common electrode 72. The top edge 77 is approximately V-shaped similar to the rung part of the pixel electrode 71. The apex of the top edge 77 is located on the line of symmetry 81. The part of the top edge 77 located in the second sub-region 2 has an angle close to 90° with respect to the line 81, whereas the remaining part of the top edge 77 located in the first sub-region 1 has an angle by far smaller than that angle, i.e., approximately 30°, with respect to the line 81. Because the parts of the top edge 77 located at each side of the line 81 are formed in such a way as to have different angles from each other, an equal action or influence to that obtained by shifting the whole top edges 77 toward the second sub-region 2 with respect to the line 81 as shown in the first embodiment is generated. For this reason, the disclination line 101 running over the boundary stabilization electrode 75 is likely to curve downward according to the positional sift of the electrode 75, as shown in FIG. 12.

The top edge 78 of the boundary stabilization electrode 76 of the common electrode 72 is close to the bottom edge 71$f$ of the adjoining pixel electrode 71. The top edge 78 is approximately V-shaped similar to the rung part of the common electrode 72. The apex of the top edge 78 is located on the line of symmetry 81. The part of the top edge 78 located in the first sub-region 1 has an angle close to 90° with respect to the line 81, whereas the remaining part of the top edge 78 located in the second sub-region 2 has an angle by far smaller than that angle, i.e., approximately 30°, with respect to the line 81. Because the parts of the top edge 78 located at each side of the line 81 are formed in such a way as to have different angles from each other, an equal action or influence to that obtained by shifting the whole top edges 78 toward the first sub-region 1 with respect to the line 81 as shown in the first embodiment is generated. For this reason, the disclination line 101 running over the boundary stabilization electrode 76 is likely to curve upward according to the positional sift of the electrode 76, as shown in FIG. 12.

As a result, in the case where no mechanical deformation is applied, the disclination lines 101 curving downward and the disclination lines 101 curving upward are alternately arranged along the line 81, as shown in FIG. 12.

In the case where a mechanical deformation such as a press with a finger is applied to the display screen of the LCD device of the fourth embodiment, even if the disclination lines 101 sway off from the state of FIG. 12 temporarily, the disclination lines 101 are inclined to return to the shifted side of the boundary stabilization electrodes 75 or 76 and as a result, these lines 101 are restored to their original ones shown in FIG. 12 in a short time and become stable. Consequently, even if abnormally displayed areas are caused on the display screen by mechanical deformation such as a press with a finger, images can be displayed uniformly and stably in such a way that the abnormally displayed areas do not remain on the display screen for a long time.

In particular, even a slight finger-pressed mark observed when the user looks at the display screen obliquely, which has not been solved anyhow so far, can be suppressed completely.

In addition, both of the boundary stabilization electrode 75 of the pixel electrode 71 and the boundary stabilization electrode 76 of the common electrode 72 each having the structure shown in FIG. 12 may be shifted in position to the upper side of FIG. 12 (i.e., toward the first sub-region 1) with respect to the line of symmetry 81, or to the lower side of FIG. 12 (i.e., toward the second subregion 2) with respect to the line 81. In these two cases, the disclination lines 101 will have the same or reverse pattern as that of the above-described second embodiment (see FIG. 10).

Fifth Embodiment

A lateral electric field type LCD device according to the fifth embodiment of the invention is shown in FIGS. 13, 14, 18A and 18B.

Figure 13:
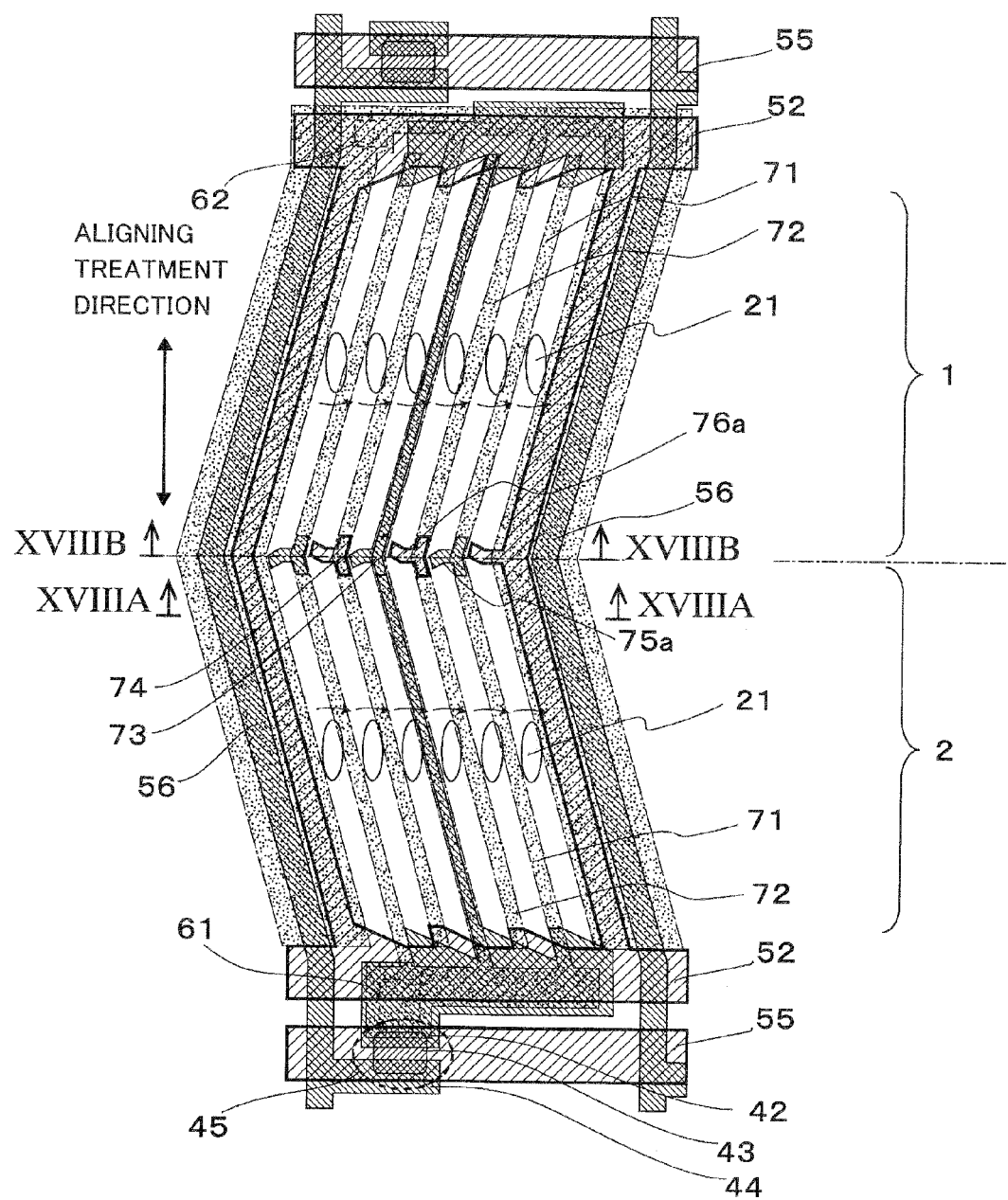
FIG. 13 is a plan view showing the structure of the active-matrix substrate of a lateral electric field type LCD device according to the fifth embodiment of the invention.
Figure 14:
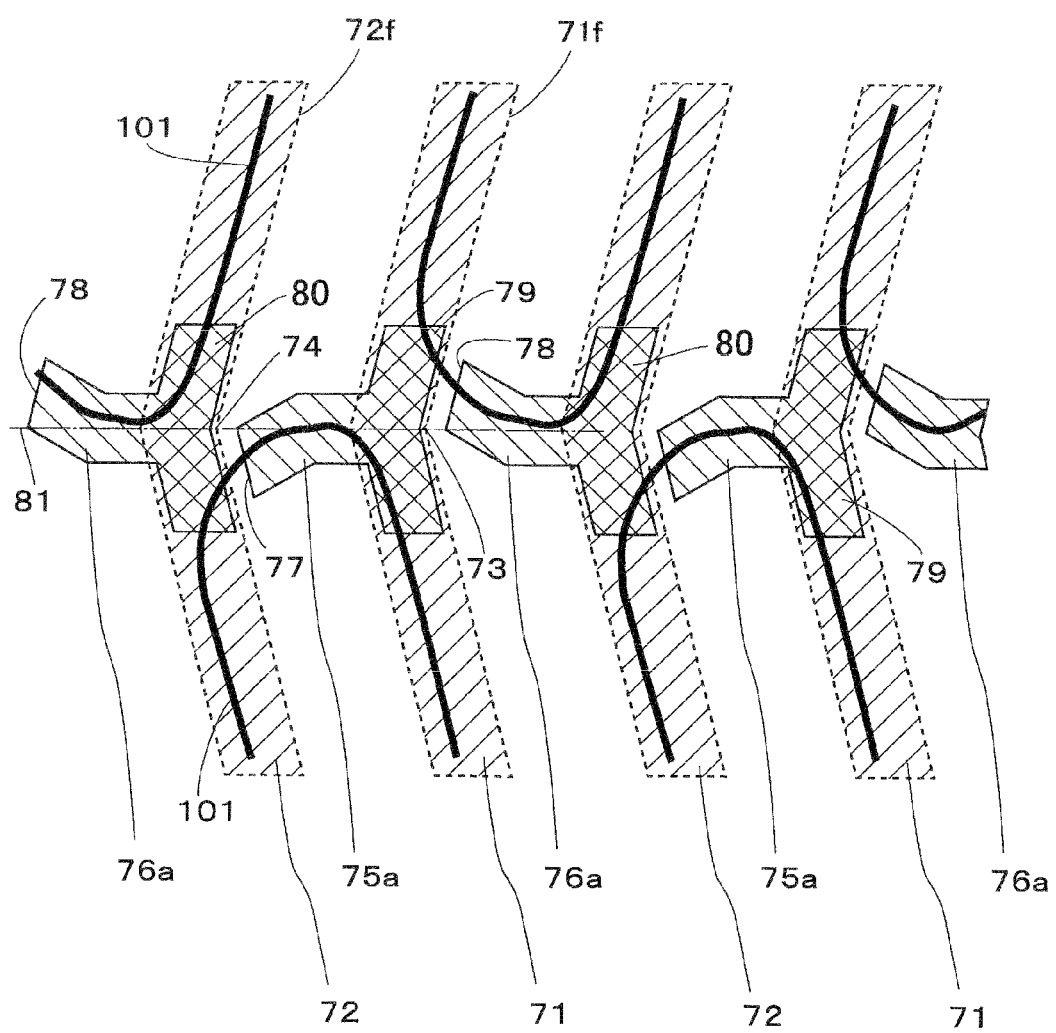
FIG. 14 is an enlarged partial plan view showing the detailed structure of the vicinities of the boundary stabilization electrodes provided for the pixel electrode and the common electrode on the active-matrix substrate of the LCD device according to the fifth embodiment of the invention.

FIG. 13 shows the structure of the active-matrix substrate of the LCD device according to the fifth embodiment. FIG. 14 shows the detailed structure of the vicinities of boundary stabilization electrodes 75$a$ and 76$a$ provided respectively for the pixel electrode 71 and the common electrode 72 of this LCD device, which are formed on the active-matrix substrate FIGS. 18A and 18B show the cross-sectional structure of this LCD device along the line XVIIIA-XVIIIA and XVIIIB-XVIIIB in FIG. 13, respectively.

In the LCD device of the fifth embodiment, similar to the device structure of the first embodiment shown in FIGS. 8 and 9, the interlayer insulating film 57 and the protective insulating film 59 are stacked on the surface of the transparent glass plate 11 in this order. In addition to these insulating films 57 and 59, an interlayer insulating film 60 is formed on the protective insulating film 59, as shown in FIGS. 18A and 18B. Unlike the structure of the first embodiment shown in FIGS. 8 and 9, both of the pixel electrode 71 and the common electrode and 72 are formed on the interlayer insulating film 60 and are comb-tooth-shaped.

The pixel electrode 71 comprises three V-shaped comb-tooth parts extending along the V-shaped drain bus lines 56. The common electrode 72 comprises four V-shaped comb-tooth parts extending along the drain bus lines 56. The comb-tooth parts of the pixel and common electrodes 71 and 72 are alternately arranged at predetermined intervals along the gate bus lines 55 in such a way as to be mated with each other in each pixel region.

Figure 18A:
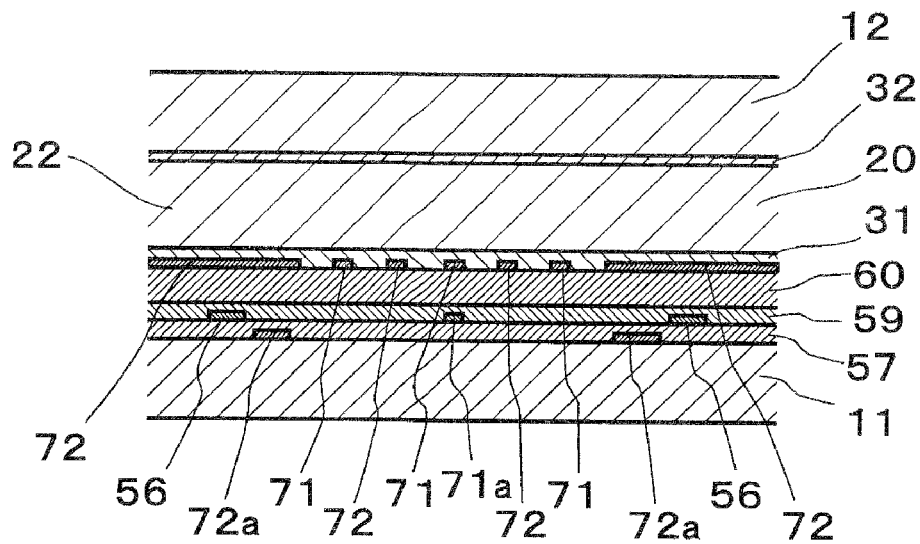
FIG. 18A is a cross-sectional view along the line XVIIIA-XVIIIA in FIG. 13, which shows the structure of the LCD device according to the fifth embodiment of the invention shown in FIG. 13, where the boundary stabilization electrodes are formed by the same metal film as the gate bus lines.
Figure 18B:
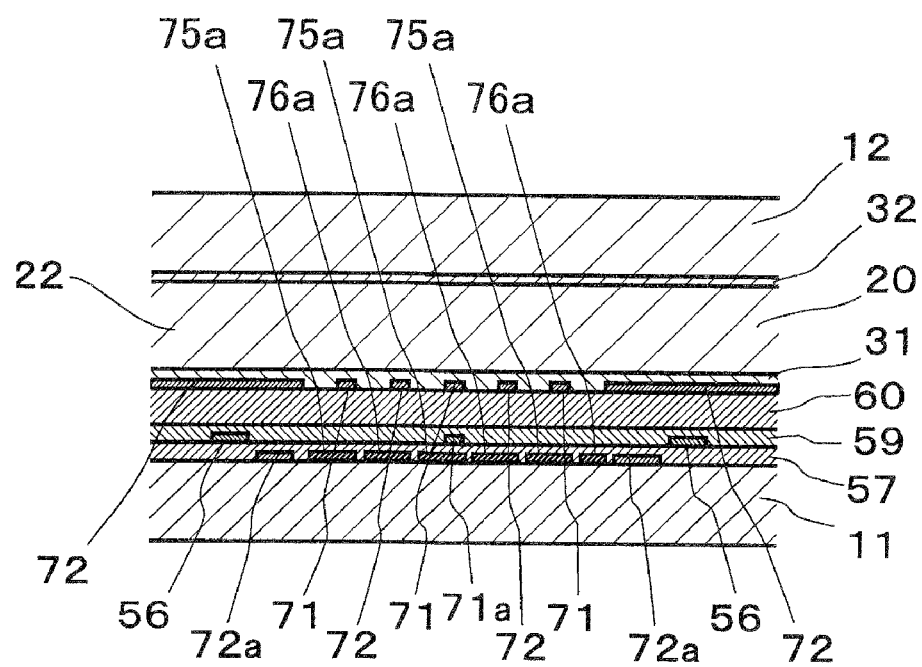
FIG. 18B is a cross-sectional view along the line XVIIIB-XVIIIB in FIG. 13, which shows the structure of the LCD device according to the fifth embodiment of the invention shown in FIG. 13, where the boundary stabilization electrodes are formed by the same metal film as the gate bus lines.

On the surface of the transparent plate 11, as shown in FIGS. 18A and 18B, auxiliary common electrodes 72a are formed in addition to the gate bus lines 55, the common bus lines 52, and the gate electrodes of the TFTs 45. The auxiliary common electrodes 72a, the gate bus lines 55, the common bus lines 52, and the gate electrodes are covered with the interlayer insulating film 57. Two of the auxiliary common electrodes 72a are assigned to each pixel region. These auxiliary common electrodes 72a, which are V-shaped like the drain bus lines 56, are respectively arranged in the vicinities of the two drain bus lines 56 located at each side of the pixel region, and extended along the said drain bus lines 56. The auxiliary common electrodes 72a are provided for electrical interconnection between the common electrodes 72 formed on the interlayer insulating film 60 and the corresponding common bus lines 52 formed on the plate 11.

On the interlayer insulating film 57, as shown in FIGS. 18A and 18B, auxiliary pixel electrodes 71a are formed in addition to the drain bus lines 56, and the source electrodes 42, the drain electrodes 44 and the semiconductor films 43 of the TFTs 45. The auxiliary pixel electrodes 71a are covered with the protective insulating film 59. One of the auxiliary pixel electrodes 71a is assigned to each pixel region. The auxiliary pixel electrode 71a is overlapped with and extended along the central comb-tooth part of the pixel electrode 71 located at the center of the pixel region. The auxiliary pixel electrode 71a is provided for electrical interconnection between the pixel electrode 71 formed on the interlayer insulating film 60 and the corresponding source electrode 42 formed on the interlayer insulating film 57. For this reason, the auxiliary pixel electrode 71a is connected electrically and mechanically to the corresponding source electrode 42 in the pixel region.

In each pixel region, the pixel electrode 71 is electrically connected to the corresponding source electrode 42 of the TFT 45 by way of a contact hole 61 that penetrates through the protective insulating film 59 and the interlayer insulating film 60, and the auxiliary pixel electrode 71a. The common electrode 72 is electrically connected to the corresponding common bus lines 52 by way of a contact hole 62 that penetrates through the interlayer insulating film 57, the protective insulating film 59, and the interlayer insulating film 60, and the auxiliary common electrodes 72a.

The drain electrode 44 is connected electrically and mechanically to the corresponding drain bus line 56, and the gate electrode is connected electrically and mechanically to the corresponding gate bus line 55. These points are the same as those of the first embodiment shown in FIGS. 8 and 9. The alignment film 31 made of an organic polymer is formed on the interlayer insulating film 60, and the surface of the alignment film 31 has been subjected to a predetermined aligning treatment. These points also are the same as the first embodiment.

In this fifth embodiment, the pixel electrodes 71 and the common electrodes 72 are formed on the interlayer insulating film 60, as shown in FIGS. 18A and 18B. This means that the pixel and common electrodes 71 and 72 are located on an upper layer (which is closer to the liquid crystal layer 20) than the gate bus lines 55 and the drain bus lines 56.

Moreover, the boundary stabilization electrode 75a for the pixel electrode 71 and the boundary stabilization electrode 76a for the common electrode 72, which are made of the same metal film as used for the gate bus lines 55, are located on the surface of the plate 11 and covered with the interlayer insulating film 57, as shown in FIG. 18B. The boundary stabilization electrodes 75a and 76a are not connected electrically to the common bus lines 52 and other electrodes or bus lines. This means that the boundary stabilization electrodes 75a and 76a are in the electrical floating state, in other words, the boundary stabilization electrodes 75a and 76a are electrically floating electrodes.

The opposite substrate coupled with the above-described active-matrix substrate with the structure of FIG. 13 and FIGS. 18A and 18B is the same in structure as the first embodiment shown in FIGS. 17A and 17B. Therefore, the explanation about the opposite substrate is omitted here.

As shown in FIG. 14, the boundary stabilization electrode 75a is overlapped with the corresponding comb-tooth part of the pixel electrode 71 at its bend 73 in such a way that the interlayer insulating film 57, the protective insulating film 59, and the interlayer insulating film 60 intervene between them. The plan shape of the combination of the boundary stabilization electrode 75a and the corresponding comb-tooth part of the pixel electrode 71 thus overlapped is the same as the plan shape of the comb-tooth part of the pixel electrode 71 (which includes the boundary stabilization electrode 75) in the first embodiment shown in FIG. 9.

Specifically, as shown in FIG. 14, the boundary stabilization electrode 75a comprises an approximately V-shaped overlapping part 79. The overlapping part 79 in its entirety is overlapped with the corresponding comb-tooth part of the pixel electrode 71 at its bend 73. The remaining part of the boundary stabilization electrode 75a protrudes along the line of symmetry 81 toward the left side of FIG. 14 (i.e., the side to which the comb-tooth part is bent) from the middle of the overlapping part 79, and is bent downward (i.e., toward the second sub-region 2) obliquely at approximately the middle position thereof in such a way as to deviate from the line 81. The said remaining part is not overlapped with the corresponding comb-tooth part of the pixel electrode 71.

The boundary stabilization electrode 76a is overlapped with the corresponding comb-tooth part of the common electrode 72 at its bend 74 in such a way that the interlayer insulating film 57, the protective insulating film 59, and the interlayer insulating film 60 intervene between them. The plan shape of the combination of the boundary stabilization electrode 76a and the corresponding comb-tooth part of the common electrode 72 thus overlapped is the same as the plan shape of the comb-tooth part of the common electrode 71 (which includes the boundary stabilization electrode 76) in the first embodiment shown in FIG. 9.

Specifically, as shown in FIG. 14, the boundary stabilization electrode 76a comprises an approximately V-shaped overlapping part 80. The overlapping part 80 in its entirety is overlapped with the corresponding comb-tooth part of the common electrode 72 at its bend 74. The remaining part of the boundary stabilization electrode 76a protrudes along the line 81 toward the left side of FIG. 14 (i.e., the side to which the comb-tooth part is bent) from the middle of the overlapping part 80, and is bent upward (i.e., toward the first sub-region 1) obliquely at approximately the middle position thereof in such a way as to deviate from the line 81. The said remaining part is not overlapped with the corresponding comb-tooth part of the common electrode 72.

As described above, the boundary stabilization electrode 76a for the common electrode 72 (which is bent obliquely to the upper side of FIG. 14 with respect to the line 81) and the boundary stabilization electrode 75a for the pixel electrode 71 (which is bent obliquely to the lower side of FIG. 14 with respect to the line 81) are alternately arranged along the line 81.

Moreover, the top edge 77 of the boundary stabilization electrode 75a for the pixel electrode 71 is close to the bottom edge 72f of the adjoining common electrode 71 in the second sub-region 2 and is approximately parallel to the said bottom edge 72f. The top edge 78 of the boundary stabilization electrode 76a for the common electrode 72 is close to the bottom edge 71f of the adjoining pixel electrode 71 in the first sub-region 1 and is approximately parallel to the said bottom edge 71f.

With the LCD device according to the fifth embodiment shown in FIGS. 13 and 14, similar to the first embodiment, the disclination line 101 running over the boundary stabilization electrode 75a is likely to curve downward toward the second sub-region 2 according to the bending shape (i.e., the deviation in shape of the top edge 77) of the protruding part of the electrode 75a. Similarly, the disclination line 101 running over the boundary stabilization electrode 76a is likely to curve upward toward the first sub-region 1 according to the bending shape (i.e., the deviation in shape of the top edge 77) of the protruding part of the electrode 76a. Accordingly, it is apparent that the same advantages as those of the first embodiment are obtained.

Next, a preferred concrete example of design values relating to the boundary stabilization electrodes 75a and 76a and the pixel and common electrodes 71 and 72 in the LCD device of the fifth embodiment will be explained below with reference to FIG. 15.

Figure 15:
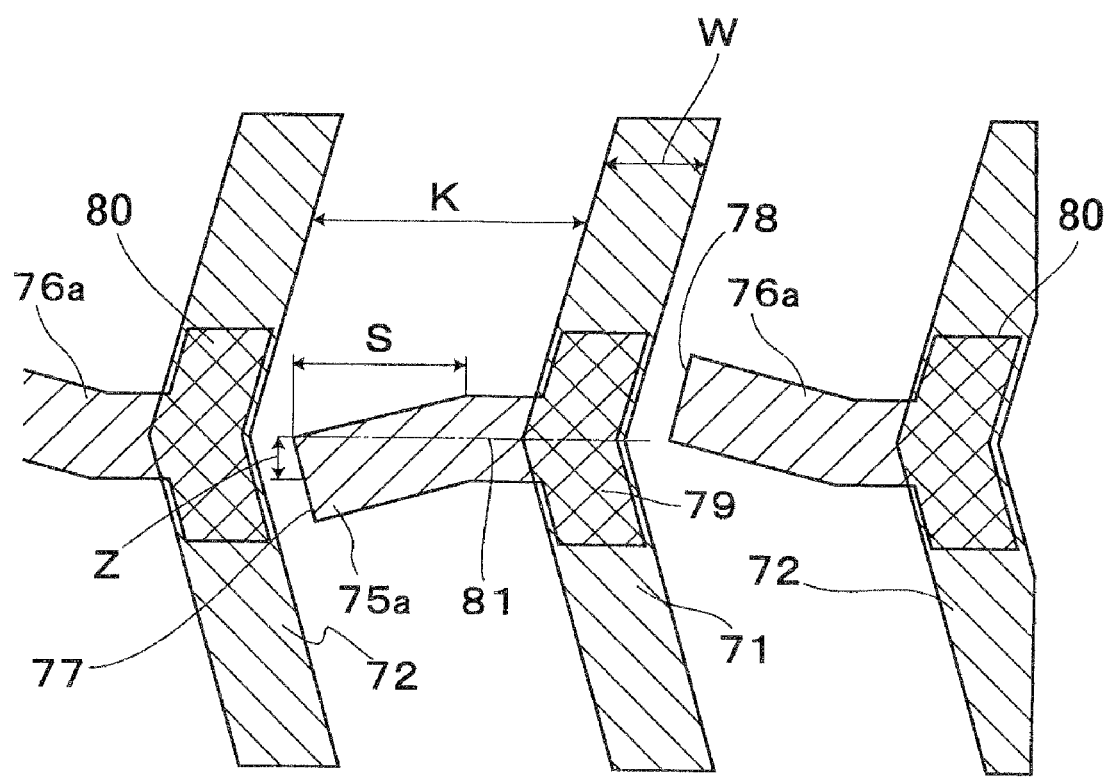
FIG. 15 is an enlarged partial plan view similar to FIG. 14, which shows a design example of the LCD device according to the fifth embodiment of the invention.

As shown in FIG. 15, for example, the pixel electrode 71 and the common electrode 72 have the same horizontal width W (which is the length measured along the horizontal direction of FIG. 15) of 3.5 µm. The pixel electrode 71 and the common electrode 72 are arranged at the same interval K (which is the length measured along the horizontal direction of FIG. 15) of 9.5 µm. Moreover, the protruding part of the boundary stabilization electrode 75a, which has a bending length S of approximately 6.0 µm, is bent downward at an angle of approximately 15°, and at the same time, the protruding part of the boundary stabilization electrode 76a, which has the same bending length S, is bent upward at the same angle. In this case, the top edge 77 of the boundary stabilization electrode 75a is shifted or deviated from the line of symmetry 81 at a deviation length Z of approximately 1.5 µm, and the top edge 78 of the boundary stabilization electrode 76a is shifted or deviated from the line 81 at the same deviation length Z.

The comb-tooth parts of the pixel electrode 71 and comb-tooth parts of the common electrodes 72 are extended at an angle of +15° with respect to the vertical direction of FIG. 15 in the upper region than the line 81 (i.e., the first sub-region 1), and at an angle of −15° with respect to the same direction in the lower region than the line 81 (i.e., the second sub-region 2). The thickness of the liquid crystal layer 22 is 4.0 µm.

The advantages of the present invention are obtained even in the case where the deviation length Z of the top edges 77 and 78 of the boundary stabilization electrodes 75a and 76a is at the level of approximately 0.5 µm. However, if the deviation length Z is set at approximately (⅓) of the thickness of liquid crystal layer 22 or more, as shown by the above-described concrete example with reference to FIG. 15, the advantages of the present invention can be obtained with more certainty.

If the deviation length Z exceeds the level of approximately twice as much as the thickness of liquid crystal layer 22, there arises a possibility that the disclination lines 101 deviate from the boundary stabilization electrodes 75a and 76a and become unstable. Therefore, it is preferred that the deviation length Z is set at a value in the range from approximately (⅓) to approximately twice of the thickness of the liquid crystal layer 22. This is because the disclination lines 101 are stable if the deviation length Z is in this range.

Figure 19:
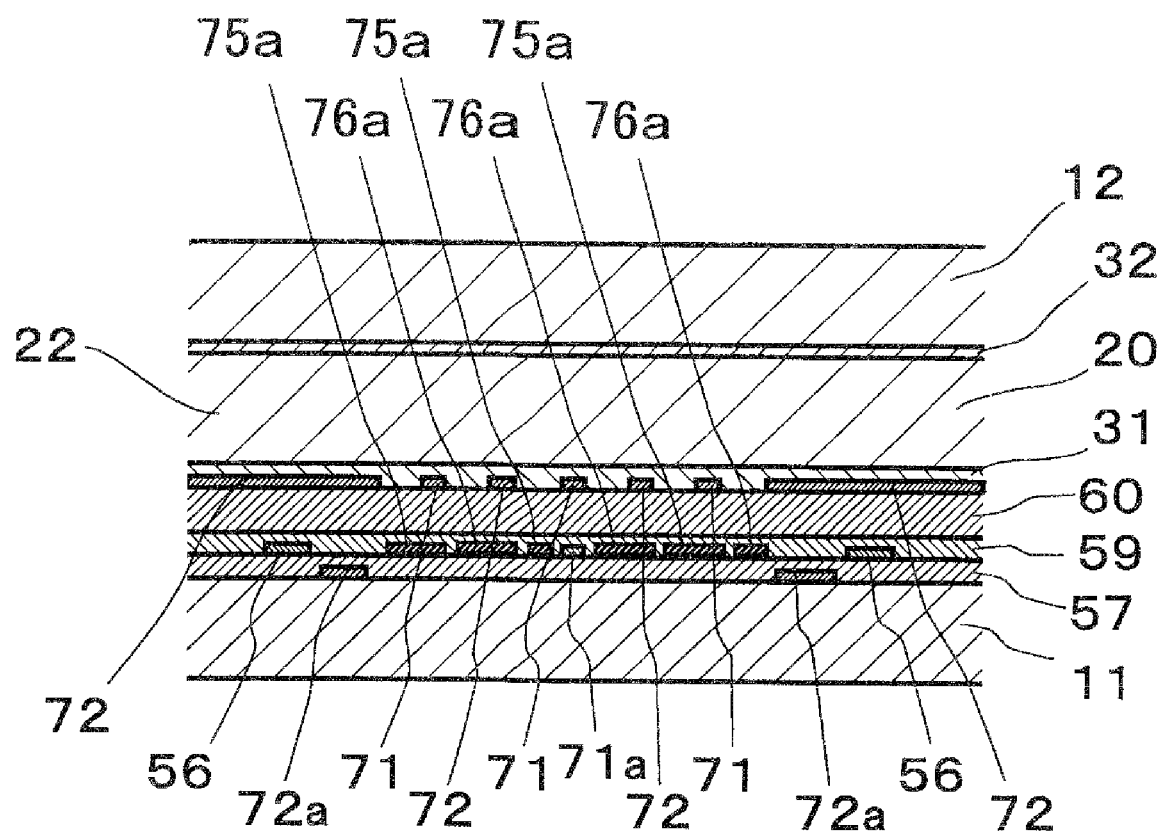
FIG. 19 is a cross-sectional view along the line XVIIIB-XVIIIB in FIG. 13, which shows a variation of the structure of the LCD device according to the fifth embodiment of the invention shown in FIG. 13, where the boundary stabilization electrodes are formed by the same metal film as the drain bus lines.

In addition, as a variation of the fifth embodiment, the boundary stabilization electrodes 75a and 76a may be made of the same metal film as used for the drain bus lines 56. In this case, the boundary stabilization electrodes 75a and 76a are located on the interlayer insulating film 57 and covered with the protective insulating film 59, as shown in FIG. 19. Since the boundary stabilization electrodes 75a and 76a are in the electrical floating state, the central boundary stabilization electrode 75a, which is overlapped with the central comb-tooth part of the pixel electrode 71 and located at the closest position to the auxiliary pixel electrode 71a, is not in contact with the said auxiliary pixel electrode 71a. In this case also, it is apparent that the same advantages as those of the fifth embodiment are obtainable.

In the structure of the fifth embodiment, each of the boundary stabilization electrodes 75b and 76b may have such a shape as used in one of the above-described second to fourth embodiments.

Sixth Embodiment

Figure 16:
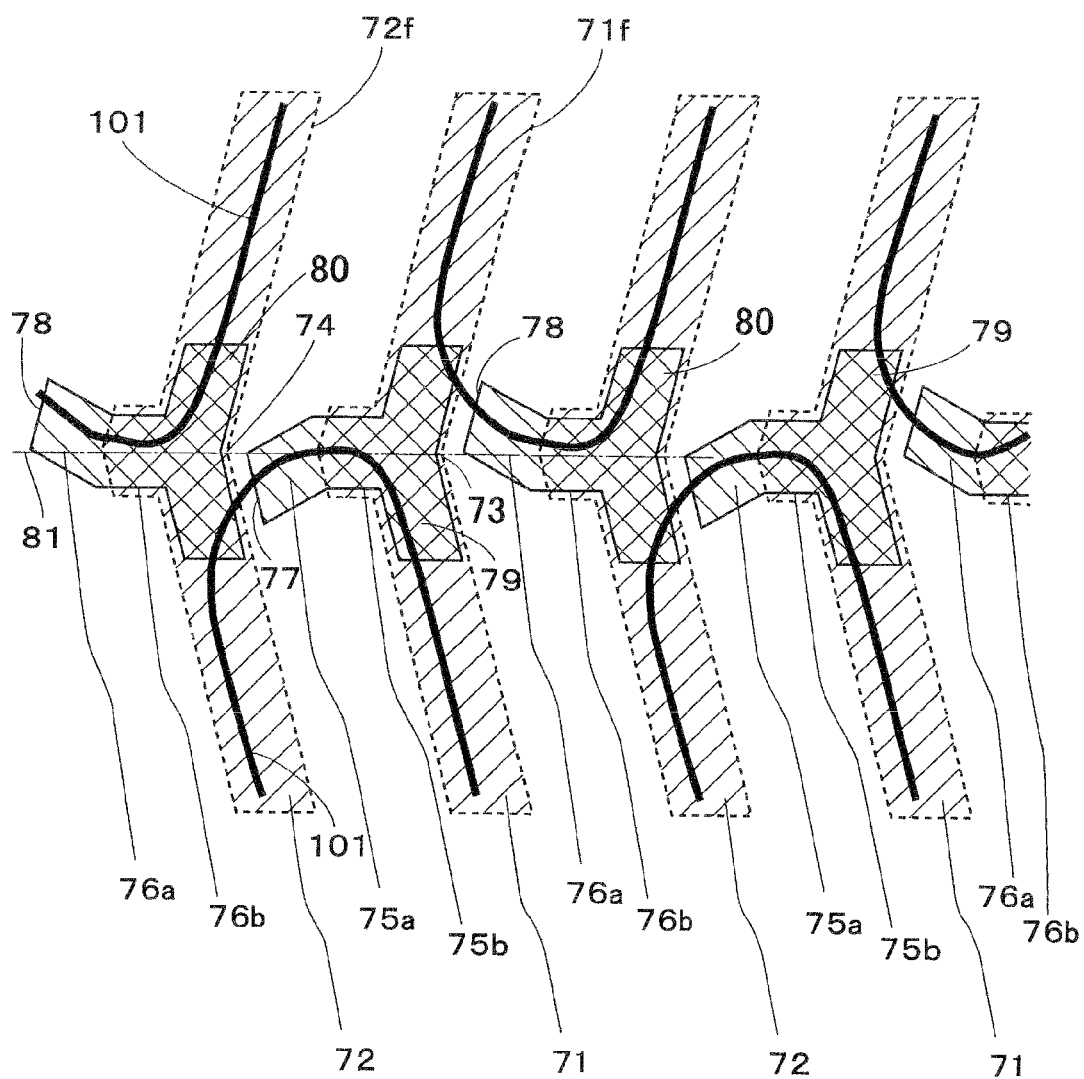
FIG. 16 is an enlarged partial plan view showing the detailed structure of the vicinities of the boundary stabilization electrodes provided for the pixel electrode and the common electrode on the active-matrix substrate of a lateral electric field type LCD device according to the sixth embodiment of the invention.

A lateral electric field type LCD device according to the sixth embodiment of the invention is shown in FIG. 16.

FIG. 16 shows the detailed structure of the vicinities of the boundary stabilization electrodes 75 and 76 provided respectively for the pixel electrodes 71 and the common electrodes 72 of this LCD device, which are formed on the active-matrix substrate. In this sixth embodiment, the same reference numerals as used in the fifth embodiment are attached to the same structural elements.

The structure of the LCD device according to the sixth embodiment corresponds to one obtained by adding respectively a protrusion-shaped boundary stabilization electrode 75b and a protrusion-shaped boundary stabilization electrode 76b to the comb-tooth part of the pixel electrode 71 and the comb-tooth part of the common electrode 72 at their bends 73 and 74 in the structure of the above-described fifth embodiment.

As shown in FIG. 16, the protrusion-shaped boundary stabilization electrode 75b of the pixel electrode 71 is formed to protrude from the bend 73 toward the left side of FIG. 16 (i.e., the side to which the comb-tooth part is bent) parallel to the line of symmetry 81. The center line of the electrode 75b is located on the line 81. Similarly, the protrusion-shaped boundary stabilization electrode 76b of the common electrode 72 is formed to protrude from the bend 74 toward the left side of FIG. 16 parallel to the line 81. The center line of the electrode 75b is located on the line 81.

Because of such the structure, the area of the overlaps between the comb-tooth part of the pixel electrode 71 and the corresponding boundary stabilization electrode 75a is increased and at the same time, the area of the overlaps between the comb-tooth part of the common electrode 72 and the corresponding boundary stabilization electrode 76a is increased, compared with those of the fifth embodiment. Accordingly, not only the same advantages as those of the fifth embodiment are obtained but also an additional advantage that the disclination lines 101 are controllable more accurately than the fifth embodiment is obtained.

In the structure of the sixth embodiment, each of the boundary stabilization electrodes 75b and 76b may have such a shape as to deviate from the line of symmetry 81 as shown in the above-described second to fourth embodiments.

Moreover, each of the boundary stabilization electrodes 75a and 76a may have the same shape as used in one of the above-described second to fourth embodiments.

Other Embodiments

Since the above-described first to sixth embodiments of are preferred examples of the present invention, it is needless to say that the present invention is not limited to these embodiments. Any other modification is applicable to these embodiments.

Figure 3:
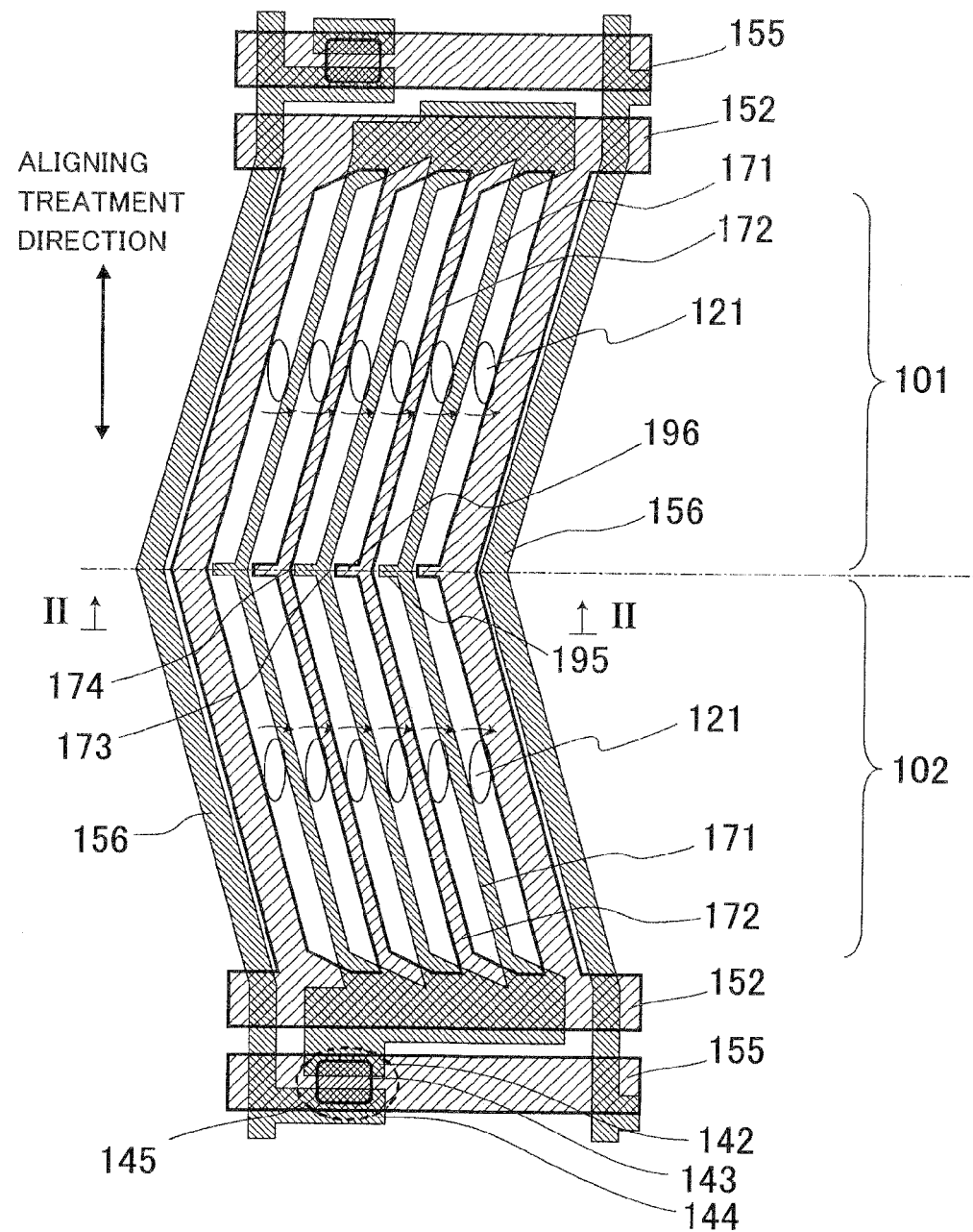
FIG. 3 is a plan view showing the structure of the active-matrix substrate of another related-art lateral electric field type LCD device disclosed in the Patent Document 4.
Figure 4:
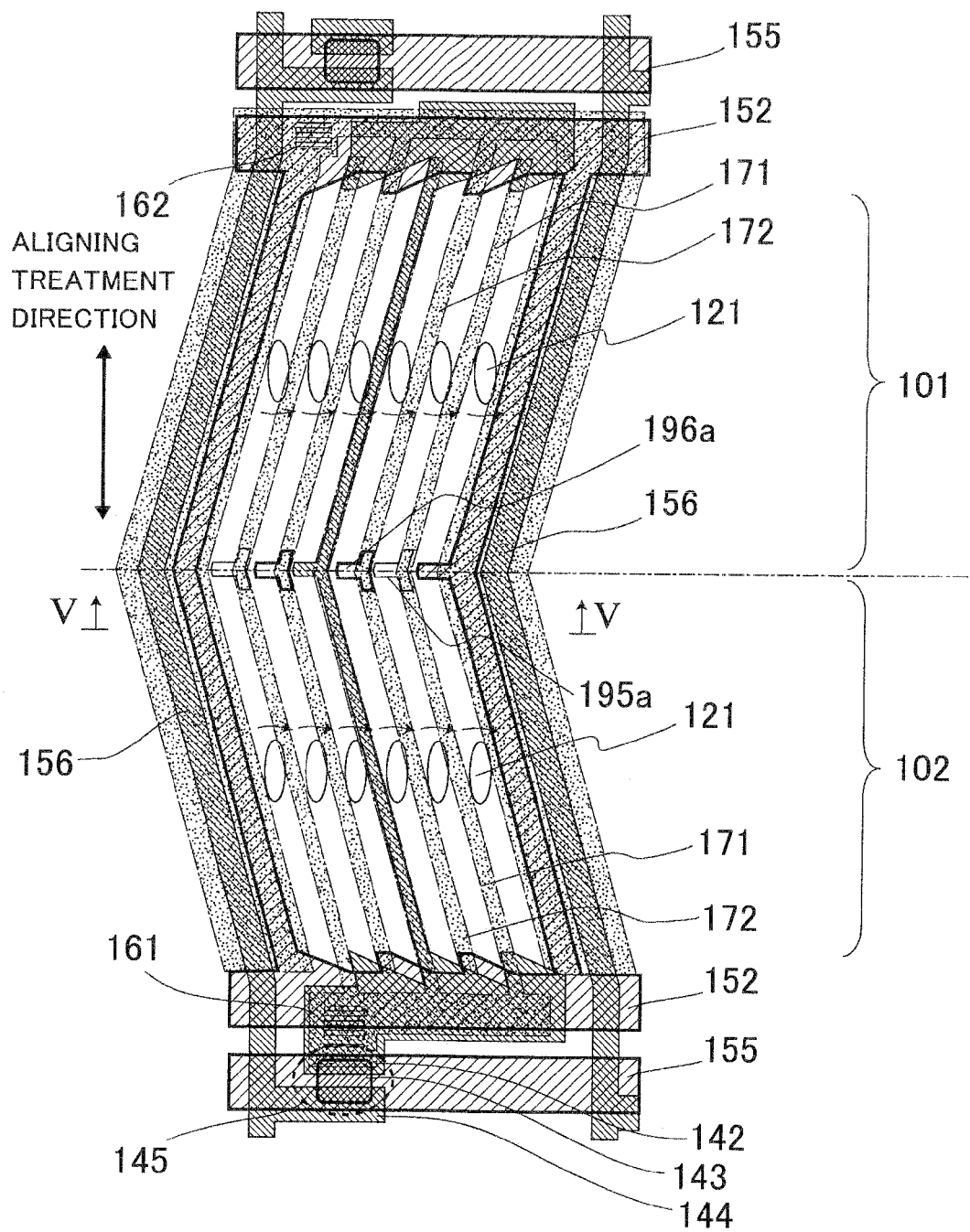
FIG. 4 is a plan view showing the structure of the active-matrix substrate of a related-art lateral electric field type LCD device formed by utilizing the technique disclosed in the Patent Document 5.
Figure 5:
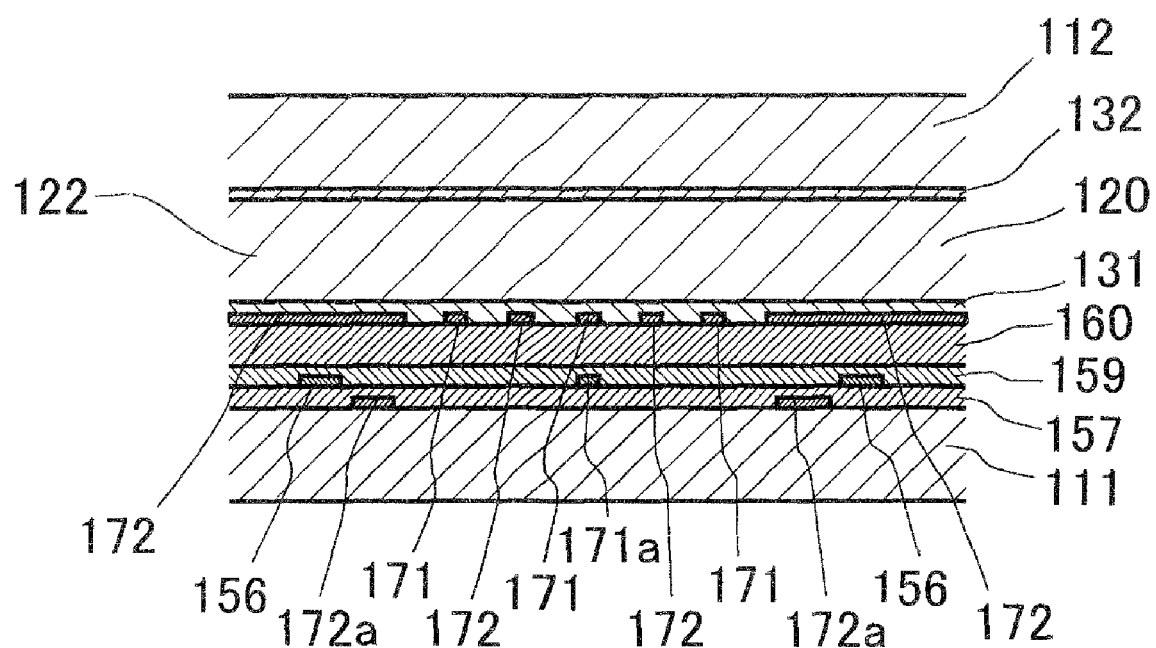
FIG. 5 is a cross-sectional view along the line V-V in FIG. 4, which shows the structure of the related-art LCD device of FIG. 4.
Figure 6:
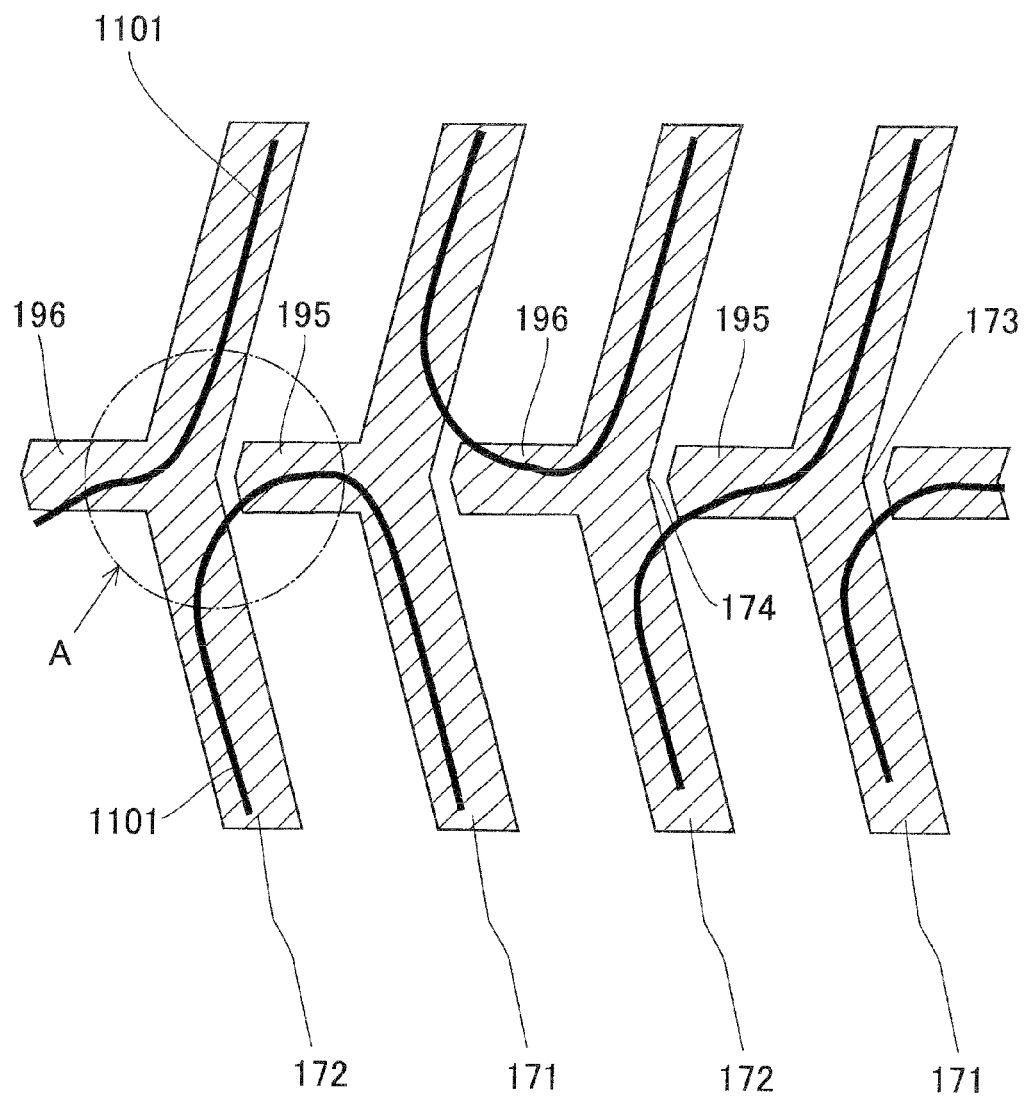
FIG. 6 is an enlarged partial plan view showing the detailed structure of the vicinities of the boundary stabilization electrodes provided at the pixel electrode and the common electrode on the active-matrix substrate of FIG. 4.
Figure 7:
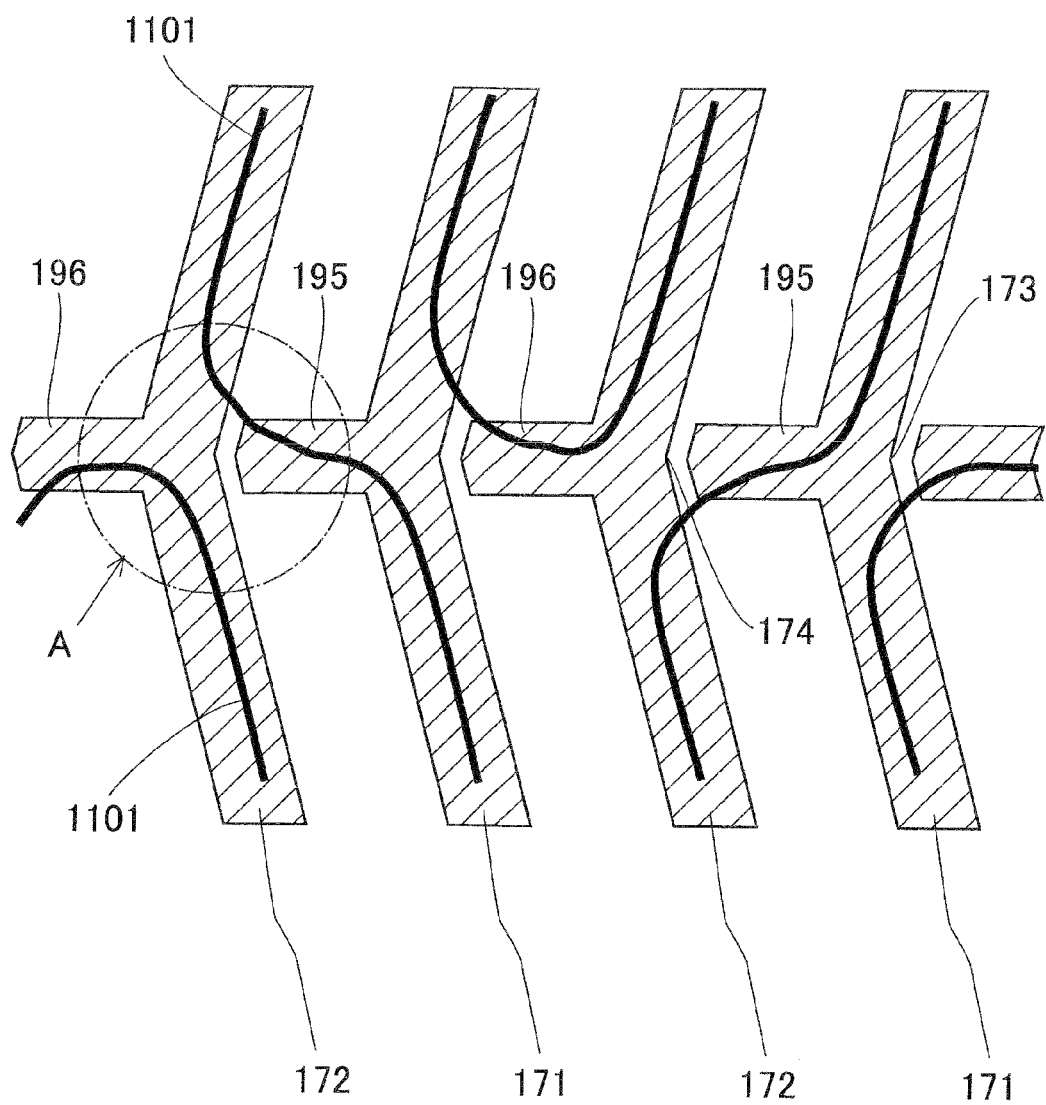
FIG. 7 is an enlarged partial plan view showing the detailed structure of the vicinities of the boundary stabilization electrodes provided at the pixel electrode and the common electrode on the active-matrix substrate of FIG. 4.

For example, in the above-described first to sixth embodiments, the boundary stabilization electrode 75 is formed at the bend 73 of each rung part of the pixel electrode 71 (which serves as the liquid crystal driving electrode), and the boundary stabilization electrode 76 is formed at the bend 74 of each rung part of the common electrode 72 (which serves as the liquid crystal driving electrode). However, the present invention is not limited to this structure. Since the advantages of the present invention are obtainable if at least one of the boundary stabilization electrode 75 of the pixel electrode 71 and the boundary stabilization electrode 76 of the common electrode 72 is present, the boundary stabilization electrode 75 or 76 may be omitted. Moreover, similar to the boundary stabilization electrode 95 or 96 of the related-art LCD device shown in FIG. 3, the boundary stabilization electrode 75 or 76 may be formed linear in such a way as to have no deviation in position and/or shape.

Furthermore, in the first embodiment (see FIG. 9), the base of the boundary stabilization electrode 75 is located on the line of symmetry 81 and at the same time, the boundary stabilization electrode 75 is bent in such a way as to be derived from the vicinity of its middle part to the lower side with respect to the line 81 (i.e., to the second sub-region 2), where the top edge 77 of the electrode 75 is shifted in position to the second sub-region 2 with respect to the line 81. However, the present invention is not limited to this structure. The boundary stabilization electrode 75 may be slightly shifted in position upward in FIG. 9 (i.e., toward the first sub-region 1) with respect to the common electrode 71, thereby locating the center of the top edge 77 on the line 81 and translating the base of the boundary stabilization electrode 75 upward from the line 81 in the structure of FIG. 9. In this case, the boundary stabilization electrode 76 is slightly shifted in position downward with respect to the pixel electrode 72, thereby locating the center of the top edge 78 on the line 81 and translating the base of the boundary stabilization electrode 76 downward from the line 81 in the same structure. Such the variation is applicable similarly to the third embodiment shown in FIG. 10, the fourth embodiment shown in FIG. 12, and the fifth embodiment shown in FIG. 14.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A lateral electric field type liquid crystal display device comprising:
    a first substrate and a second substrate opposed to each other at a predetermined gap;
    a liquid crystal layer formed in the gap between the first substrate and the second substrate;
    a first liquid crystal driving electrode and a second liquid crystal driving electrode, formed in each of pixel regions, for applying liquid crystal driving electric field to the liquid crystal layer;
    the first liquid crystal driving electrode and the second liquid crystal driving electrode comprising a first bend and a second bend, respectively:
    each of the pixel regions being divided into a first sub-region and a second sub-region by the first bend and the second bend as a boundary, wherein a rotation direction of liquid crystal molecules in the first sub-region is different from a rotation direction of liquid crystal molecules in the second sub-region; and
    a boundary stabilization electrode formed at least one of the first bend and the second bend, wherein a shape or position of the boundary stabilization electrode is deviated from a line of symmetry of the first bend and the second bend.

2. The device according to claim 1, wherein the boundary stabilization electrode is electrically connected to the first liquid crystal driving electrode.

3. The device according to claim 1, wherein the boundary stabilization electrode is united with the first liquid crystal driving electrode as a protrusion that protrudes from the first bend.

4. The device according to claim 1, wherein the boundary stabilization electrode is electrically insulated from the first liquid crystal driving electrode and the second liquid crystal driving electrode.

5. The device according to claim 1, wherein the boundary stabilization electrode is electrically insulated from the first liquid crystal driving electrode and the second liquid crystal driving electrode, and is overlapped with the first liquid crystal driving electrode.

6. The device according to claim 1, wherein a top or bottom of the boundary stabilization electrode comprises a deviation or shift from the line of symmetry; and
    the deviation or shift is set at a value in a range from approximately ($\frac{1}{3}$) of a thickness of the liquid crystal layer to approximately twice of the thickness of the liquid crystal layer.

7. The device according to claim 1, wherein the first liquid crystal driving electrode is ladder-shaped to have first rung parts, and the second liquid crystal driving electrode is ladder-shaped to have second rung parts;
    the first rung parts and the second rung parts are alternately arranged at intervals along the boundary in each of the pixel region; and
    each of the first rung parts comprises the first bend, and each of the second rung parts comprises the second bend.

8. The device according to claim 1, wherein the first liquid crystal driving electrode comprises first comb-tooth parts, and the second liquid crystal driving electrode comprises second comb-tooth parts;

the first comb-tooth parts and the second comb-tooth parts are alternately arranged at intervals along the boundary in each of the pixel region; and each of the first comb-tooth parts comprises the first bend, and each of the second comb-tooth parts comprises the second bend.

9. The device according to claim 1, wherein the boundary stabilization electrode comprises an asymmetrical plan shape with respect to the line of symmetry formed by deviation of shape toward the first sub-region or the second sub-region.

10. The device according to claim 1, wherein the boundary stabilization electrode is shifted in position toward the first sub-region or the second sub-region in such a way as to be located at an asymmetrical position with respect to the line of symmetry.

11. A lateral electric field type LCD device comprising:
a first substrate and a second substrate opposed to each other at a predetermined gap;
a liquid crystal layer formed in the gap between the first substrate and the second substrate;
a first liquid crystal driving electrode and a second liquid crystal driving electrode, formed in each of pixel regions, for applying liquid crystal driving electric field to the liquid crystal layer;
the first liquid crystal driving electrode and the second liquid crystal driving electrode comprising a first bend and a second bend, respectively:
each of the pixel regions being divided into a first sub-region and a second sub-region by the first bend and the second bend as a boundary, wherein a rotation direction of liquid crystal molecules in the first sub-region is different from a rotation direction of liquid crystal molecules in the second sub-region;
a first boundary stabilization electrode formed at the first bend, wherein a shape or position of the first boundary stabilization electrode is deviated from a line of symmetry of the first bend and the second bend; and
a second boundary stabilization electrode formed at the second bend, wherein a shape or position of the second boundary stabilization electrode is deviated from the line of symmetry of the first bend and the second bend.

12. The device according to claim 11, wherein the first boundary stabilization electrode is electrically connected to the first liquid crystal driving electrode; and
the second boundary stabilization electrode is electrically connected to the second liquid crystal driving electrode.

13. The device according to claim 11, wherein the first boundary stabilization electrode is united with the first liquid crystal driving electrode as a protrusion that protrudes from the first bend; and
the second boundary stabilization electrode is united with the second liquid crystal driving electrode as a protrusion that protrudes from the second bend.

14. The device according to claim 11, wherein each of the first boundary stabilization electrode and the second liquid crystal driving electrode is electrically insulated from the first liquid crystal driving electrode and the second liquid crystal driving electrode.

15. The device according to claim 11, wherein the first boundary stabilization electrode is electrically insulated from the first liquid crystal driving electrode and the second liquid crystal driving electrode, and is overlapped with the first liquid crystal driving electrode; and
the second boundary stabilization electrode is electrically insulated from the first liquid crystal driving electrode and the second liquid crystal driving electrode, and is overlapped with the second liquid crystal driving electrode.

16. The device according to claim 11, wherein a top or bottom of the first boundary stabilization electrode comprises a deviation or shift from the line of symmetry, where the deviation or shift is set at a value in a range from approximately (⅓) of a thickness of the liquid crystal layer to approximately twice of the thickness of the liquid crystal layer; and
a top or bottom of the second boundary stabilization electrode comprises a deviation or shift from the line of symmetry, where the deviation or shift is set at a value in a range from approximately (⅓) of a thickness of the liquid crystal layer to approximately twice of the thickness of the liquid crystal layer.

17. The device according to claim 11, wherein the first liquid crystal driving electrode is ladder-shaped to have first rung parts, and the second liquid crystal driving electrode is ladder-shaped to have second rung parts;
the first rung parts and the second rung parts are alternately arranged at intervals along the boundary in each of the pixel region; and
each of the first rung parts comprises the first bend, and each of the second rung parts comprises the second bend.

18. The device according to claim 11, wherein the first liquid crystal driving electrode comprises first comb-tooth parts, and the second liquid crystal driving electrode comprises second comb-tooth parts;
the first comb-tooth parts and the second comb-tooth parts are alternately arranged at intervals along the boundary in each of the pixel region; and
each of the first comb-tooth parts comprises the first bend, and each of the second comb-tooth parts comprises the second bend.

19. The device according to claim 11, wherein the first boundary stabilization electrode comprises an asymmetrical plan shape with respect to the line of symmetry formed by deviation of shape toward the first sub-region or the second sub-region; and
the second boundary stabilization electrode comprises an asymmetrical plan shape with respect to the line of symmetry formed by deviation of shape toward the first sub-region or the second sub-region.

20. The device according to claim 11, wherein the first boundary stabilization electrode is shifted in position toward the first sub-region or the second sub-region in such a way as to be located at an asymmetrical position with respect to the line of symmetry; and
the second boundary stabilization electrode is shifted in position toward the first sub-region or the second sub-region in such a way as to be located at an asymmetrical position with respect to the line of symmetry.

* * * * *